(12) United States Patent
Goodwin et al.

(10) Patent No.: US 11,248,901 B2
(45) Date of Patent: Feb. 15, 2022

(54) SHEARING INTERFEROMETRY MEASUREMENT DEVICE FOR MICROSCOPY

(71) Applicant: Nikon Corporation, Tokyo (JP)

(72) Inventors: Eric Peter Goodwin, Oro Valley, AZ (US); Wan Qin, Oro Valley, AZ (US)

(73) Assignee: Nikon Corporation

( * ) Notice: Subject to any disclaimer, the term of this patent is extended or adjusted under 35 U.S.C. 154(b) by 0 days.

(21) Appl. No.: 17/262,656

(22) PCT Filed: Jul. 22, 2019

(86) PCT No.: PCT/JP2019/028622
§ 371 (c)(1),
(2) Date: Jan. 22, 2021

(87) PCT Pub. No.: WO2020/022252
PCT Pub. Date: Jan. 30, 2020

(65) Prior Publication Data
US 2021/0302150 A1 Sep. 30, 2021

Related U.S. Application Data

(60) Provisional application No. 62/703,222, filed on Jul. 25, 2018.

(51) Int. Cl.
*G01B 9/02* (2006.01)
*G01B 9/04* (2006.01)
(Continued)

(52) U.S. Cl.
CPC ........... *G01B 9/02098* (2013.01); *G01B 9/04* (2013.01); *G01N 21/453* (2013.01); *G02B 21/34* (2013.01);
(Continued)

(58) Field of Classification Search
CPC .... G01B 9/02098; G01B 9/04; G01N 21/453; G02B 21/34; G03H 1/0005; G03H 2001/005
See application file for complete search history.

(56) References Cited

U.S. PATENT DOCUMENTS 5,426,503 A 6/1995 Kusunose
2010/0165355 A1 7/2010 Kato
(Continued)

FOREIGN PATENT DOCUMENTS

JP H05204134 8/1993
JP 2015031658 2/2015
(Continued)

OTHER PUBLICATIONS

Written Opinion of the International Searching Authority from International Patent Application No. PCT/JP2019/028622, Completed Aug. 8, 2019, dated Aug. 20, 2019.
(Continued)

*Primary Examiner* — Michael A Lyons
(74) *Attorney, Agent, or Firm* — Van Pelt, Yi & James LLP

(57) ABSTRACT

Object interference in biological samples generated by lateral shearing interference microscopes is addressed by a shearing microscope slide comprising a periodic structure having alternating reference and sample regions. In some embodiments, the reference regions are configured to provide references that remove sample overlap in a sheared microscopic measurement. A system for generating sheared microscopic measurements is also provided that comprises an inlet configured to receive a sample material, an outlet configured to release a portion of the sample material, and a periodic structure having a plurality of interleaved reference and sample channels. In some cases, the sample channels are configured to accommodate a flow of sample (Continued)

material from the inlet to the outlet and the reference channels are configured to provide references that remove sample overlap in a sheared microscopic measurement.

22 Claims, 27 Drawing Sheets

(51) Int. Cl.
  *G01N 21/45* (2006.01)
  *G02B 21/34* (2006.01)
  *G03H 1/00* (2006.01)
  *G03H 1/04* (2006.01)
(52) U.S. Cl.
  CPC ......... *G03H 1/0005* (2013.01); *G03H 1/0443* (2013.01); *G03H 2001/005* (2013.01); *G03H 2001/0447* (2013.01)

(56) References Cited

U.S. PATENT DOCUMENTS

| | | | | |
|---|---|---|---|---|
| 2011/0044865 | A1* | 2/2011 | Groisman | B01L 9/527 422/503 |
| 2015/0304616 | A1 | 10/2015 | Tada | |
| 2019/0226972 | A1* | 7/2019 | Javidi | G03H 1/0443 |
| 2019/0250558 | A1* | 8/2019 | Javidi | G03H 1/0005 |

FOREIGN PATENT DOCUMENTS

| | | |
|---|---|---|
| WO | 2012173017 | 12/2012 |
| WO | 2013180187 | 12/2013 |

OTHER PUBLICATIONS

Chu et al., Plasma Free Reversible and Irreversible Microfluidic Bonding, Lab Chip, 2017, pp. 267-273.

Dinh et al., Development of Reversible Bonding for Microfluidic Applications, Microfluid Nanofluid, 2015.

English Machine Translation of JPH5204134, 2020.

Goodwin et al., Field Guide to Interferometric Optical Testing, SPIE Field Guides, 2006, vol. FG10.

International Search Report from International Patent Application No. PCT/JP2019/028622, Completed Aug. 8, 2019, dated Aug. 20, 2019.

* cited by examiner

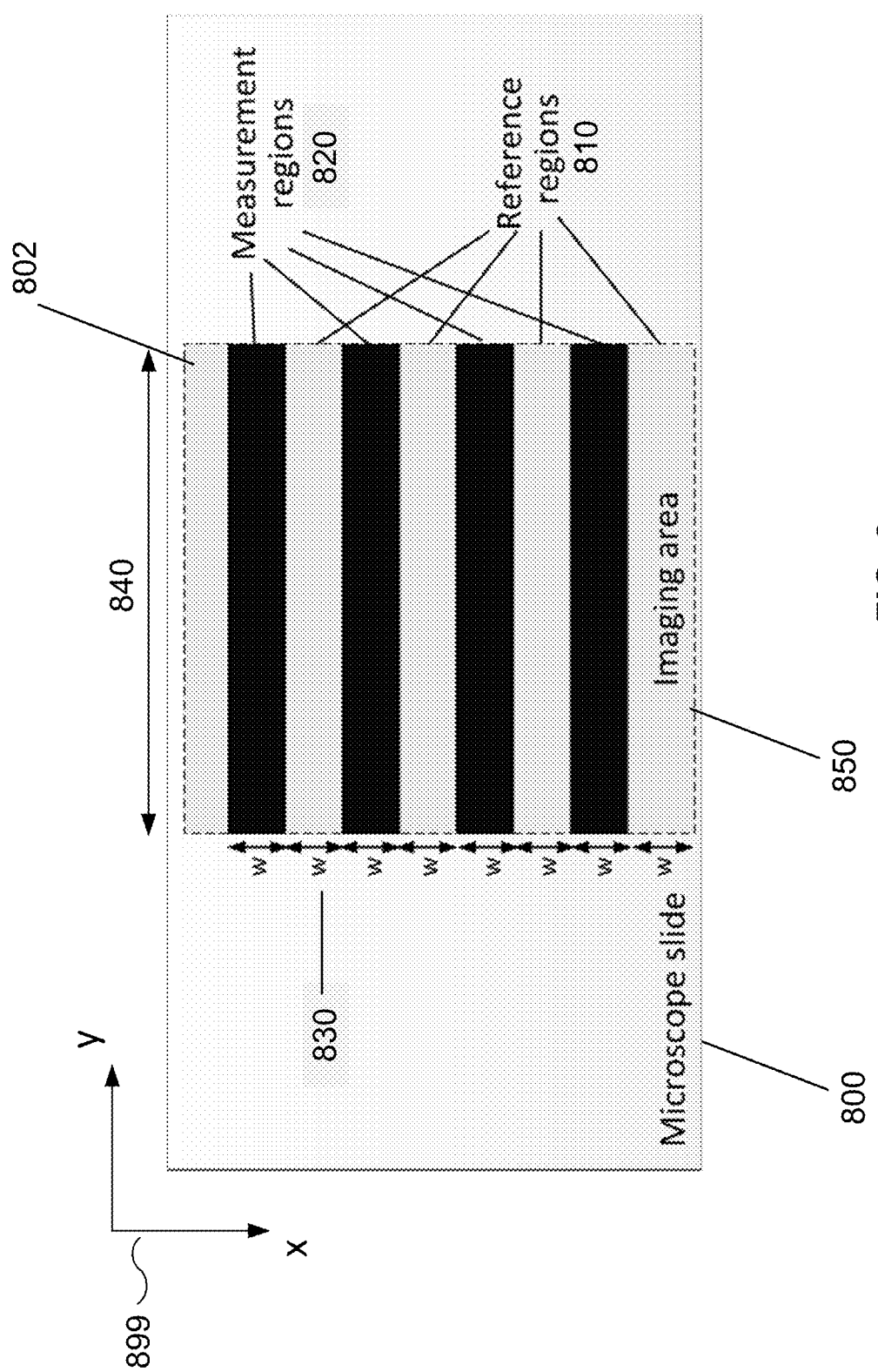

1600

- Receive a material comprising a plurality of objects to be measured into a periodic structure through an inlet wherein the periodic structure includes: a plurality of reference channels, wherein each reference channel is configured to provide a reference that removes sample overlap in the sheared microscopic measurement and a plurality of sample channels, wherein each sample channel is configured to accommodate a flow of the material from the inlet to the outlet, wherein the reference channels and the sample channels alternate, and wherein each of the reference channels is configured to have an optical path length variation along a direction of material flow that provides a mechanism for temporal phase shifting — 1610

- Release a portion of the material from the periodic structure through an outlet — 1620

- Apply a force to cause the material to flow through the periodic structure from the inlet to the outlet — 1630

- Apply a light source to send light through the periodic structure — 1640

- Generate a sheared microscopic measurement in response to the light sent through the periodic structure — 1650

- Generate a series of phase-shifted snapshots in time, wherein each phase-shifted snapshot captures an image of an object in a different location in a sample channel as the object moves along a length of the sample channel from the inlet to the outlet — 1660

- Determine a phase change in response to each phase-shifted snapshot — 1665

- Determine a phase associated with an object measurement in response to the phase change and the series of phase-shifted snapshots — 1670

FIG. 16

SHEARING INTERFEROMETRY MEASUREMENT DEVICE FOR MICROSCOPY

CROSS REFERENCE TO OTHER APPLICATIONS

This application claims priority to International (PCT) Application No. PCT/JP2019/28622, entitled SHEARING INTERFEROMETRY MEASUREMENT DEVICE FOR MICROSCOPY filed Jul. 22, 2019, which claims priority to U.S. Provisional Patent Application No. 62/703,222, entitled SHEARING INTERFEROMETRY MEASUREMENT DEVICE FOR MICROSCOPY filed Jul. 25, 2018, each of which is incorporated herein by reference for all purposes.

BACKGROUND OF THE INVENTION

Lateral shearing interference microscopes (also referred to as Digital Holographic Microscope, DHM, or Quantitative Phase Imaging, QPI) are used to measure the phase in transmission of light through objects in a sample plane of the microscope. In particular, lateral shearing interference microscopes have been used for 3D cell measurements in biological samples, with the phase measurement allowing the optical thickness of the cell to be measured. In some cases, for example, in the case of densely populated biological samples or samples with a high concentrations of cells, existing techniques for taking sheared microscopic measurements suffer from data loss due to overlapping sheared images. One problem in using a standard biological microscope slide to make shearing interferometry measurements of samples having more concentrated cell populations is sample overlap in the resulting sheared microscopic measurements (e.g., laterally sheared interferograms). The sample overlap due to lateral shearing can generate unwanted artifacts in the measurement making it difficult to interpret and to obtain accurate information regarding the sample being measured. Accordingly, a technique is disclosed to enable shearing interferometry measurements to be taken while avoiding problematic sample overlap.

BRIEF DESCRIPTION OF THE DRAWINGS

Various embodiments of the invention are disclosed in the following detailed description and the accompanying drawings.

FIG. 8 is a depiction of an exemplary embodiment of a microscope slide prepared using the technique disclosed and described with respect to FIGS. 7A-7C.

FIG. 16 shows a flowchart depicting an exemplary method for generating sheared microscopic measurements including by determining a phase change in response to a series of phase-shifted snapshots.

DETAILED DESCRIPTION

Figure 1:
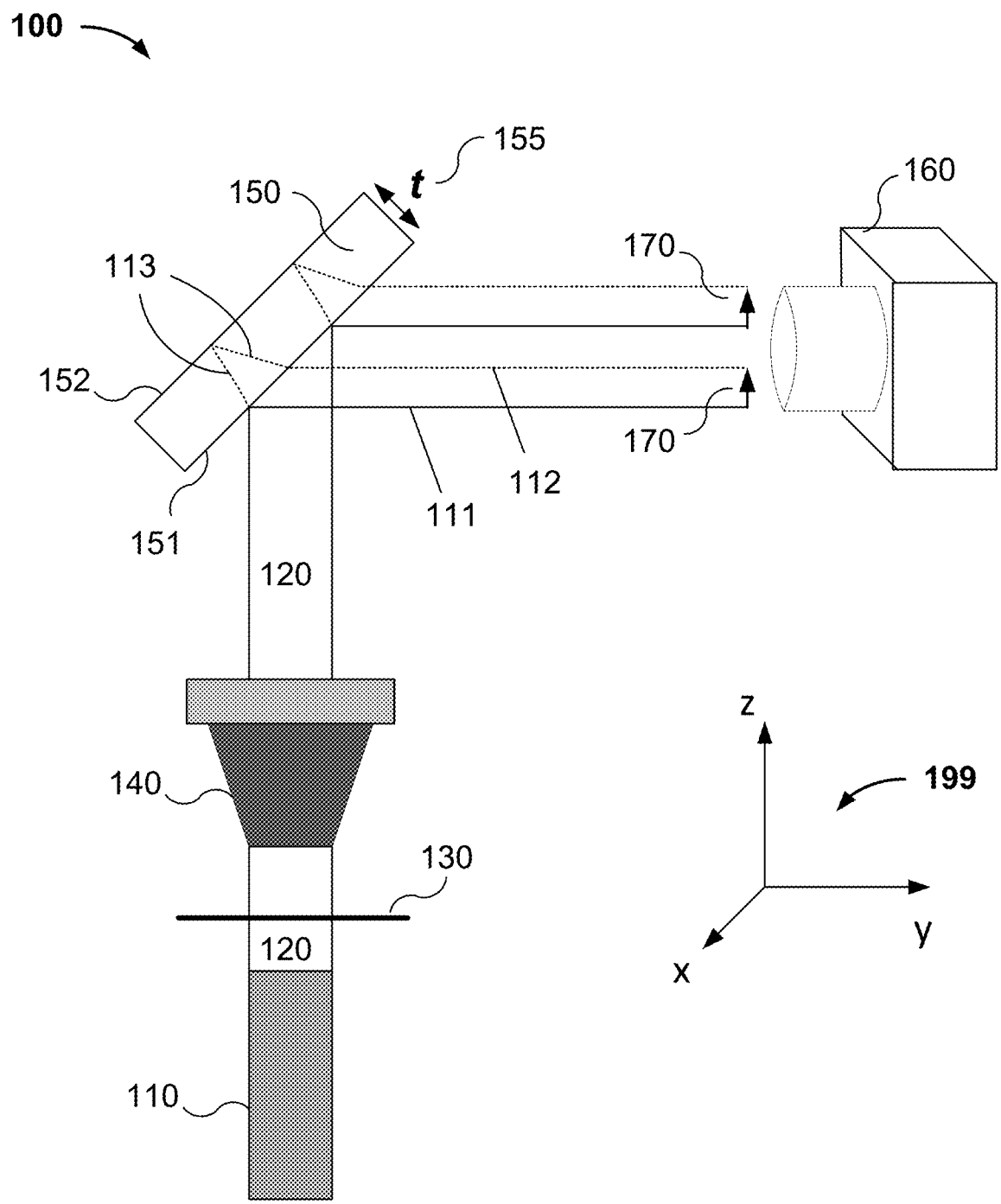
FIG. 1 depicts a system schematic of an exemplary embodiment of a shearing interference system or an LSI system for a microscope.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using a standard biological slide to take 3D cell measurements with a lateral shearing interference microscope generates an interferogram that results from a wavefront being sheared and interfered with itself, where two copies of the cell image are separated by the shear distance. This technique often leads to interfering a cell with another cell in the resulting measurement. Additionally, the lack of a planar reference when using such microscopes makes analysis complicated.

Accordingly, the problem of interference of objects in biological samples in a lateral shearing interference microscope is addressed by a technique that employs a shearing microscope slide comprising a substrate and a periodic structure disposed on the substrate including a plurality of reference regions and a plurality of sample regions, wherein: the plurality of reference regions and the plurality of sample regions alternate and each of the reference regions in the plurality of reference regions is configured to provide a reference that removes sample overlap in a sheared microscopic measurement. In some embodiments, the reference regions are configured to provide planar references that remove sample overlap in the sheared microscopic measurement. In other embodiments, the disclosed technique includes a method comprising applying a light source to send light through a periodic structure disposed on a substrate and generating a sheared microscopic measurement in response to the light sent through the periodic structure, wherein: the periodic structure includes a plurality of reference regions and a plurality of sample regions; the plurality of reference regions and the plurality of sample regions alternate; and each of the reference regions in the plurality of reference regions is configured to provide a reference that removes sample overlap in a sheared microscopic measurement.

In some embodiments, the light source is an illumination optical system that illuminates light to a sample. Additionally, the disclosed technique includes a shearing interference method comprising: illuminating light to a sample; separating a transmitted light from the sample; and detecting an interference image by the separated light; wherein the sample has a sample region and a reference region configured in accordance with a shear distance by the shearing member.

A shearing interference system is also disclosed comprising an illumination optical system that illuminates light to a sample; a shearing member that separates a transmitted light from the sample; and a detector that detects an interference image by the separated light; wherein the sample has a sample region and a reference region configured in accordance with a shear distance by the shearing member.

Additionally, a shearing microscope slide as disclosed herein comprises a substrate and a structure disposed on the substrate. In some embodiments, the structure includes a reference region and a sample region. The reference region is configured in accordance with a shear distance in a shearing interference system that measures the shearing microscope slide.

A system for generating sheared microscopic measurements is also provided that comprises a substrate; an inlet disposed on the substrate, wherein the inlet is configured to receive a material comprising a plurality of objects to be measured; an outlet disposed on the substrate, wherein the outlet is configured to release a portion of the material; and a periodic structure disposed on the substrate. In some embodiments, the periodic structure includes a plurality of reference channels, wherein each reference channel in the plurality of reference channels is configured to provide a reference that removes sample overlap in a sheared microscopic measurement and a plurality of sample channels, wherein each sample channel in the plurality of sample channels is configured to accommodate a flow of the material from the inlet to the outlet, wherein the plurality of reference channels and the plurality of sample channels alternate.

A method for generating sheared microscopic measurements is also provided, the method comprising receiving a material comprising a plurality of objects to be measured into a periodic structure through an inlet, releasing a portion of the material from the periodic structure through an outlet, applying a force to cause the material to flow through the periodic structure from the inlet to the outlet, applying a light source to send light through the periodic structure, and generating a sheared microscopic measurement in response to the light sent through the periodic structure. In some embodiments, the periodic structure comprises a plurality of interleaved reference channels and sample channels, wherein the reference channels are configured to provide references that remove sample overlap in the sheared microscopic measurement.

Interferometers use the interference of light to make precise measurements of physical properties of objects including for example surfaces, thicknesses, surface roughness, optical power, material homogeneity and distances. These properties are measured by analyzing a photographic record of light interference patterns, or interferogram, produced by the interferometer. For example, in the case of two beams that interfere to generate an interferogram in a two-beam interferometer, relative information can be extracted about the optical path difference (OPD) between the two beams from the generated interferogram. A discussion of the fundamentals of interferometry and interferometric optical testing can be found in a *Field Guide to Interferometric Optical Testing, SPIE Field Guides, Volume FG*10, by Eric P. Goodwin and James C. Wyant (2006) the entirety of which is incorporated herein by reference.

Lateral Shearing Interferometer (LSI) systems in microscopes have been used for 3D cell measurements in biological samples, with the phase measurement allowing the optical thickness of the cell to be measured. One example of implementing an LSI system in a microscope has been developed at the University of Connecticut (UCONN) by a research team lead by Bahram Javidi. (See, e.g., I. Moon, A. Anand, M. Cruz, and B. Javidi, "Identification of Malaria-Infected Red Blood Cells Via Digital Shearing Interferometry and Statistical Inference," *IEEE Photonics Journal*, vol. 5, no. 5, October 2013, the entirety of which is incorporated herein by reference). The UCONN team developed a simple 3D microscope based on Lateral Shearing Interferometry (also referred to as a Digital Holographic Microscope, or DHM; or 3D microscope). The approach is fundamentally based on measuring the phase in transmission of objects in the sample plane of a microscope.

FIG. 1 depicts a system schematic of an exemplary embodiment of a shearing interference system (e.g. an LSI system) 100 for a microscope similar in approach to the one developed at UCONN. In the example shown, a light source 110 (e.g., laser source or laser diode) or illumination optical system is used to send or illuminate light 120 to a sample through a specimen plane 130. Imaging is done using a microscope objective 140, which in this case is a finite conjugate microscope objective. The specimen plane 130 holds a sample having an object of interest, such as a biological sample slide having cells to be measured. The microscope objective 140 magnifies the object of interest, such as a cell to be measured, located on the specimen plane. The light travels from the laser source 110 through the specimen plane 130 containing the sample, passes through the microscope objective 140, and hits a shearing member (e.g. glass plate 150) that separates a transmitted light from the sample. In some embodiments, the shearing member is an uncoated glass plate. In this example, for reference purposes, a set of 3D primary axes is provided at 199.

In the LSI system 100 of FIG. 1, a shearing member (e.g. an uncoated glass plate 150) having a thickness t at 155 is tilted at an angle (which in the example shown is 45°) to reflect or separate at least some of the transmitted light directed to the shearing member (e.g. uncoated glass plate 150) to a detector 160 that detects an interference image by the separated light, which may comprise a camera or other device to capture an image. In this case, the shearing member (e.g., uncoated glass plate 150) at 45° is used to create two images separated by a shear distance 170 at the detector 170. More specifically, due to the thickness 155 of glass plate 150, a first beam 111 reflects off of a front surface 151 of glass plate 150 while a second beam 112 reflects off a back surface 152 of glass plate 150 while traversing glass plate twice, as shown at 113 in FIG. 1.

The light source or illumination optical system must have sufficient temporal and spatial coherence in order to overcome the optical path difference due to the plate. Here, for a glass plate having a thickness t=3 mm, an index of refraction n=1.5, and tilted at 45°, the optical path difference (OPD) is roughly $$OPD = \frac{2nt}{\cos\left(\operatorname{asin}\left[\frac{\sin[45°]}{n}\right]\right)} = 10.2 \text{ mm}$$

Accordingly, the glass thickness traversed by a beam in this example is $$\frac{OPD}{n} = 6.8 \text{ mm}$$

The defocus that this creates is roughly $$\frac{n-1}{n} * 6.8 \text{ mm} = 2.3 \text{ mm}$$

This defocus value is the defocus between two diverging beams, resulting in tilt fringes between the two beams, the frequency of which depends on the glass plate thickness and the conjugates at which the finite conjugate microscope objective is being used.

One key component of LSI system 100 as shown in FIG. 1 is the light source or illumination optical system. As mentioned above, the OPD is at least 10 mm, which means that the temporal coherence of the source must exceed this value in order to have fringes. In some examples, a single longitudinal mode laser is used to guarantee this much coherence length.

Using a shearing member such as a glass plate for shearing interferometry offers a low cost approach that also benefits from overall simplicity and stability. However, there are some disadvantages to using a glass plate as a shearing member including: aberrations from having a glass plate in the diverging beam; defocus between the two beams (2.3 mm above), which means at least one image will be out of focus; low light efficiency (only using the 4% Fresnel reflection from the uncoated glass plate for each beam);

coherence length requirements for the light source; and requiring a fold in the optics path, which makes it impractical to use this approach on a commercial microscope. For this reason, other approaches for shearing interferometry can be used and the disclosed technique is not limited in scope by the approach taken for shearing interferometry.

As shown in FIG. 1, a lateral shearing approach can make the optics of the microscope relatively simple. The light 120 that passes through the sample on the specimen plane 130 is interfered with a sheared or shifted version of itself, resulting in a measurement or interferogram at the detector 160 comprising a superposition of a sample image with a shifted version of the same sample image. The phase difference contains information about the relative optical path length between one part of the sample and another part of the sample. For biological or other samples that are sparsely populated by cells or other objects of interest, it is likely but not guaranteed that each cell is interfered with a region containing only saline or other suspension fluid (e.g., air).

However, for other samples or flows having a higher cell density, there will often or always be interference between one cell and another in the interferogram generated at the detector 160. Additionally, a "reference beam" of the interferometer (e.g., a first version of the sample image generated by a first beam 111 reflecting off of a front surface 151 of glass plate 150 of FIG. 1) also includes phase information about many cells, and so cells are interfered with other cells throughout the measured phase map. (Note that the term "reference beam" is in quotes here because traditional shearing interferometers do not have a reference beam, since typically two measurement beams are interfered with each other after one has been shifted; in other words, assigning the name reference beam to one of the beams is entirely arbitrary.) Because the sheared images result in interference of cells with other cells in the sample through the measured phase map, it is difficult if not impossible to make quantitative measurements about any of the cells or regions of the sample.

Figure 2A:
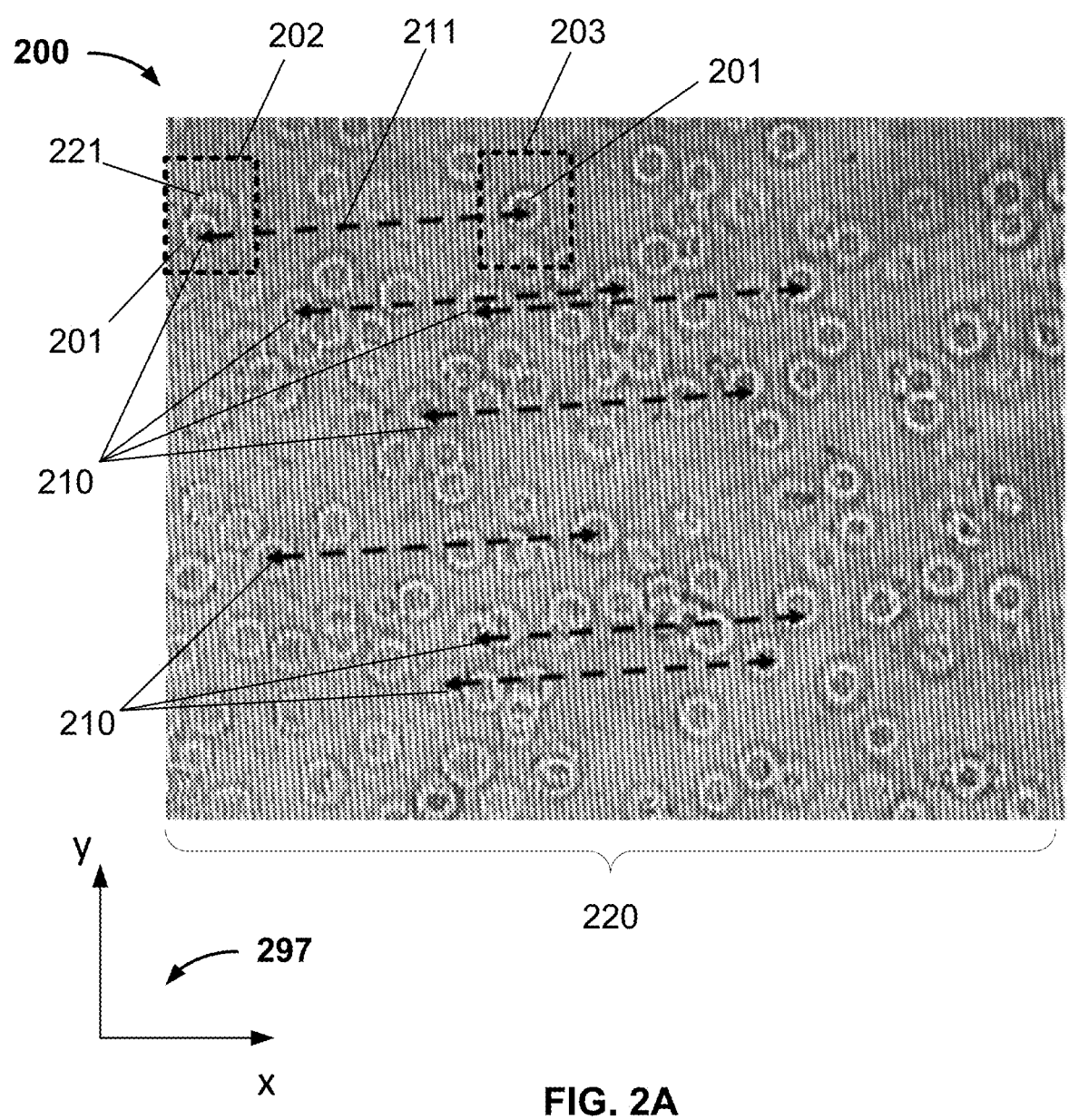
FIG. 2A depicts an exemplary image taken using an embodiment of a shearing interference system or an LSI system.

FIG. 2A depicts an exemplary image taken using an embodiment of an LSI system. In particular, the exemplary image of FIG. 2A shows an interferogram 200 generated by an exemplary LSI system 100 as shown in FIG. 1, comprising a sample image superimposed with a shifted version of itself. A set of black vectors 210 shown in FIG. 2A indicate an orientation and magnitude of the shear as applied to a set of cells in the sample, each black vector corresponding to the shear applied to each cell in the set of cells. Note that, due to the shearing in this case, each cell in the set of cells appears twice in the interferogram 200—once on the left, and once on the right. For example, a left image 202 of a selected cell 201 in the set of cells appears in interferogram 200 along with a right image 203 of the same selected cell 201, with an orientation and magnitude of the shear shown by the black vector 211. Other cells in this particular sample and their shifted versions are also shown with corresponding black vectors representing the orientation and magnitude of the shear. In this example, for reference purposes, a set of 2D primary axes corresponding to the viewing plane is provided at 297.

Figure 2B:
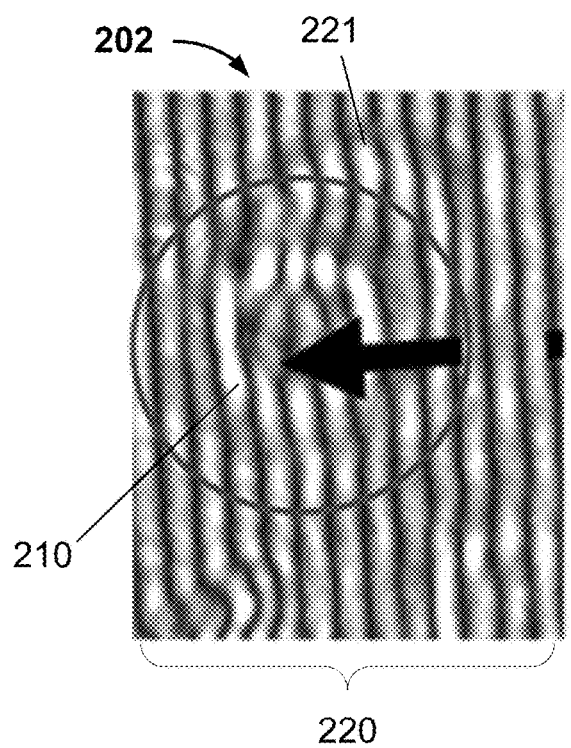
FIG. 2B shows a magnified version of a portion of the interferogram of FIG. 2A corresponding to an area surrounding a left image of a selected cell.
Figure 2C:
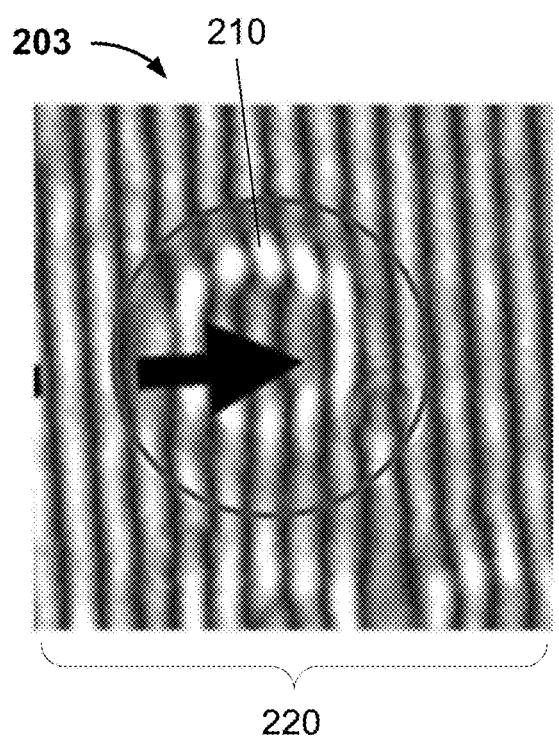
FIG. 2C shows a magnified version of a portion of the interferogram of FIG. 2A corresponding to an area surrounding a right image of the same selected cell.

FIGS. 2B and 2C show a magnified view of a selected cell 201 taken at two places or locations on the interferogram 200 of FIG. 2A. More specifically, FIG. 2B shows a magnified version of a portion of interferogram 200 of FIG. 2A corresponding to an area 202 surrounding a left image (shown in FIG. 2A) of selected cell 201, while FIG. 2C shows a magnified version of a portion of interferogram 200 of FIG. 2A corresponding to an area 203 surrounding a right image (shown in FIG. 2A) of the same selected cell 201. For reference purposes, a set of 2D primary axes corresponding to the viewing planes for each of FIGS. 2B and 2C are provided at 298 and 299 respectively.

As shown in FIGS. 2A and 2B, the area 202 surrounding a left image of the selected cell 201 is interfered with an image 221 of another cell, an artifact resulting from the effect of shearing that is manifested in the interferogram. Note that in an area 203 surrounding a right image of the selected cell, there is no image of another cell that interferes with the image of cell 201.

Recall that a goal of interferometry is to find the phase (i.e., a measured phase map) of the interferogram as physical properties of objects of interest (in this case, cells) including for example precise measurements of surfaces, thicknesses, surface roughness, optical power, material homogeneity, and distances can then be determined once the phase is known. Here, two reflected beams are created by the two surfaces of a solid glass plate (e.g., a first beam 111 reflected off of a front surface 151 of glass plate 150 and a second beam 112 reflected off a back surface 152 of glass plate 150 while traversing glass plate twice, as shown at 113 in FIG. 1). In this case, there is no easy way to generate a moving source for a reference beam for which a phase shift can be introduced and thus, using a phase shifting approach to determine the phase is not possible in this particular LSI configuration. However, high frequency tilt fringes allow a spatial heterodyne technique to be applied, where the phase of a single frame or interferogram can be found by taking a Fourier transform.

Returning to FIGS. 2A-2C, an inspection of interferogram 200 reveals tilt fringes 220, which are more apparent and visibly defined in the magnified versions of the left and right images of the selected cell depicted in FIGS. 2B and 2C respectively. These tilt fringes 220 allow a spatial heterodyne technique to be used to calculate the phase of interferogram 200. As noted previously, black vectors 210 shown in FIG. 2A on interferogram 200 indicate the orientation and magnitude of the shear. Note that, as expected, the tilt fringes move in opposite directions for the two images of the selected cell. This is because the phase map shows the phase difference between the two beams. For example, in the case of a sample that includes cells suspended in a saline solution, assume the OPL (optical path length) through a cell is longer than the OPL through saline only. For a given cell, one of the images is the phase difference of (cell−saline), which is positive. For the other image of the same cell, the fringe phase is the phase difference (saline−cell) which is negative. Therefore, the fringe patterns shift in opposite directions for the two regions in the phase map that represent the same cell, and as explained above, the phase change of the tilt fringes due to the selected cell is opposite for the left versus the right image.

Another key issue is evident in FIG. 2A. Recall that a shearing interferometer makes two copies of a beam, shifts one (in the example shown, along the direction of the vector), and then interferes them by superimposing the two copies into one image (the interferogram). Each cell or feature in an image of the beam will thus be duplicated in the interferogram, and each region in the image is interfered with another region of the image. Consequently, it is likely that a cell in a sample, and especially in a sample having a higher cell density, will be interfered with another cell in the sample, making it impractical to find the phase (OPD) of these overlapping cells. This is a general tradeoff of a common path, shearing interferometer approach. In the example of FIG. 2A, the field of view is somewhat sparsely populated by cells (less than 50% fill), and yet there are many places in the interferogram 200 where cells overlap and the phase cannot be measured.

Figure 3:
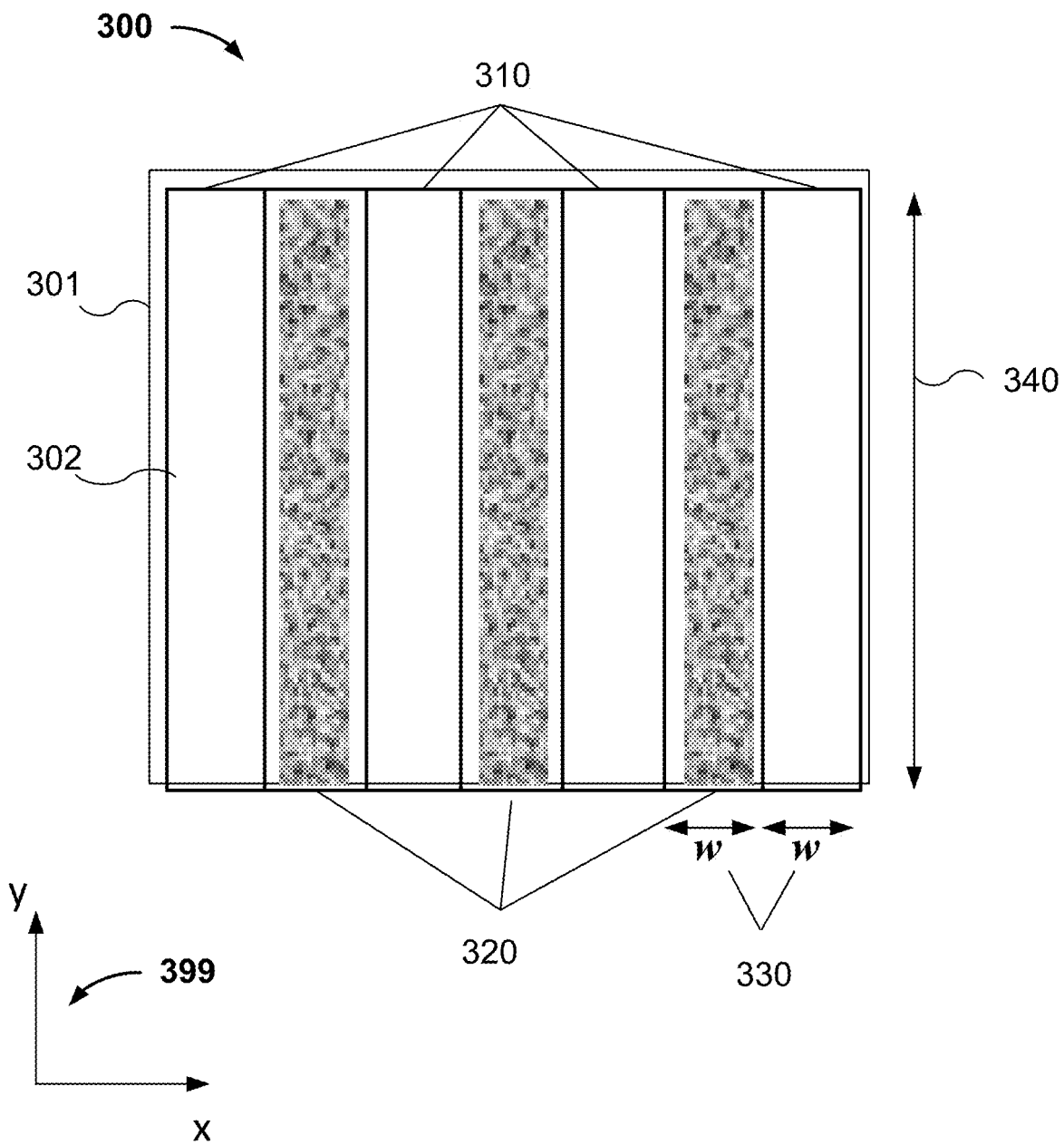
FIG. 3 is a depiction of an exemplary embodiment of a shearing microscope slide comprising a periodic structure disposed on a substrate.

FIG. 3 is a depiction of an exemplary embodiment of a shearing microscope slide 300 comprising a substrate 301 and a periodic structure 302 disposed on the substrate 301. The periodic structure 302 includes a plurality of reference regions 310 and a plurality of sample regions 320. In the example shown, the plurality of reference regions and the plurality of sample regions alternate and each of the reference regions in the plurality of reference regions is configured to provide a reference that removes sample overlap in a sheared microscopic measurement. For instance, one example of a sheared microscopic measurement is the interferogram 200 of FIG. 2. In some examples, the reference regions and sample regions are parallel strips that extend along a length 340 of the periodic structure 302, wherein each parallel strip is about equal in width as each of the other parallel strips, and wherein the reference regions are configured to provide planar references that remove sample overlap in the sheared microscopic measurement. In this example, for reference purposes, a set of 2D primary axes corresponding to the viewing plane is provided at 399.

In some embodiments, the sheared microscopic measurement comprises a laterally sheared interferogram (e.g., interferogram 200 of FIG. 2) generated by a lateral shearing interferometer, (e.g., the shearing interferometer depicted in FIG. 1). In some cases, the reference regions and sample regions are parallel strips that extend along a length 340 of the periodic structure, wherein each parallel strip is about equal in width (e.g., a width w at 330) as each of the other parallel strips, and wherein a shear distance in the lateral shearing interferometer is an odd integer multiple of the width of each strip. The minimum shear distance (see, e.g., FIG. 1 at 170) in the lateral shearing interferometer is then the strip width w (or channel width w) at 330. In some embodiments, smaller regions are used, wherein the shear distance is an odd integer multiple (e.g., N*w, where N is an odd integer) of the width (e.g., a width w at 330) of each strip or channel.

In some examples, the slide 300 is configured to have about 50% fill of measurement sample (measurement regions) and about 50% with no samples or cells (reference regions). A preferable configuration is to alternate strips of measurement and reference as shown in FIG. 3, wherein the slide has about 50% fill of measurement sample and about 50% of reference regions having no sample. With this setup, all of the sample regions are interfered with feature-free (cell free) reference regions, making the resulting interferogram subject to a clearer interpretation.

Figure 4:
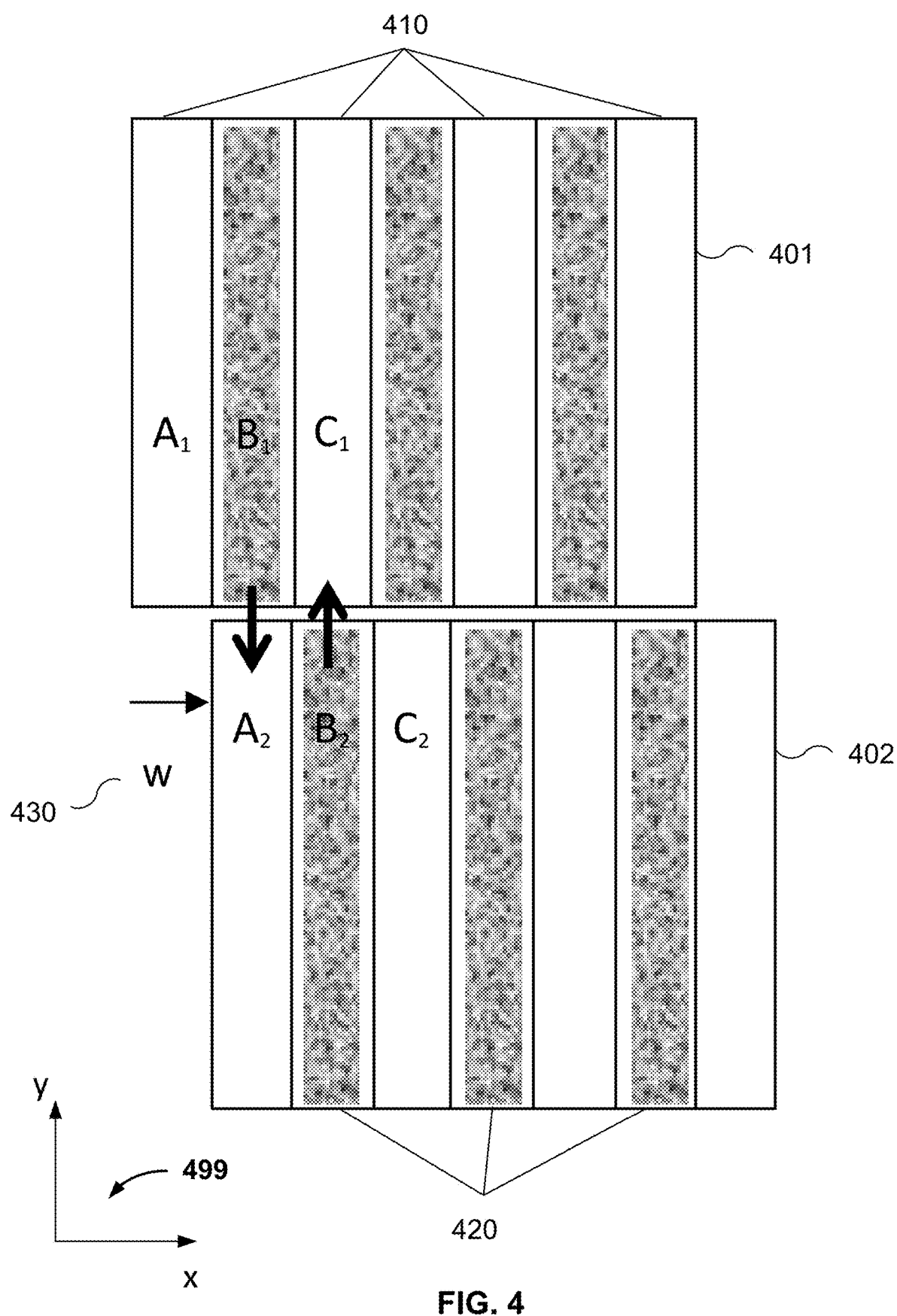
FIG. 4 illustrates the use of a shearing microscope slide as disclosed herein to produce two images of a sample on a slide separated by a shear distance.

FIG. 4 illustrates the use of a shearing microscope slide as disclosed herein to produce two images 401 and 402 of the sample on the slide separated by a shear distance w at 430. As described above, a first image 401 formed from a first beam overlapped or superimposed with a sheared version of itself (e.g., a second image 402 formed from a second beam) to generate an interferogram (e.g., interferogram 200 of FIG. 2A). As shown in FIG. 4, the sample channels and reference channels alternate to form a periodic structure such that if the shear distance w is matched to the period of the sample channels, the sample channels are always interfered with a reference channel that does not contain cells and the situation illustrated in FIG. 2B of a cell interfering with another cell is always avoided. In this example, for reference purposes, a set of 2D primary axes corresponding to the viewing plane is provided at 499.

In the example shown, a first sample channel or region $B_1$ of a first image 401 is interfered with a first reference channel or region $A_2$ of a second image 402. Moreover, a second reference channel or region $C_1$ of the first image 401 is interfered with a first sample channel or region $B_2$ of the second image 402. Note that in this case each sample channel or region is interfered with two different reference regions (i.e. it is measured twice). Here, sample channel or region $B_1$ is interfered with reference channel or region $A_2$ and sample channel or region $B_2$ (which is a copy of $B_1$ and hence contains the same sample) is interfered with reference channel or region $C_1$. In this manner, the configuration described herein that alternates reference regions and sample regions can improve measurement accuracy through the use of redundant measurements resulting from the overlap of a sample region with two different reference regions.

Figure 5:
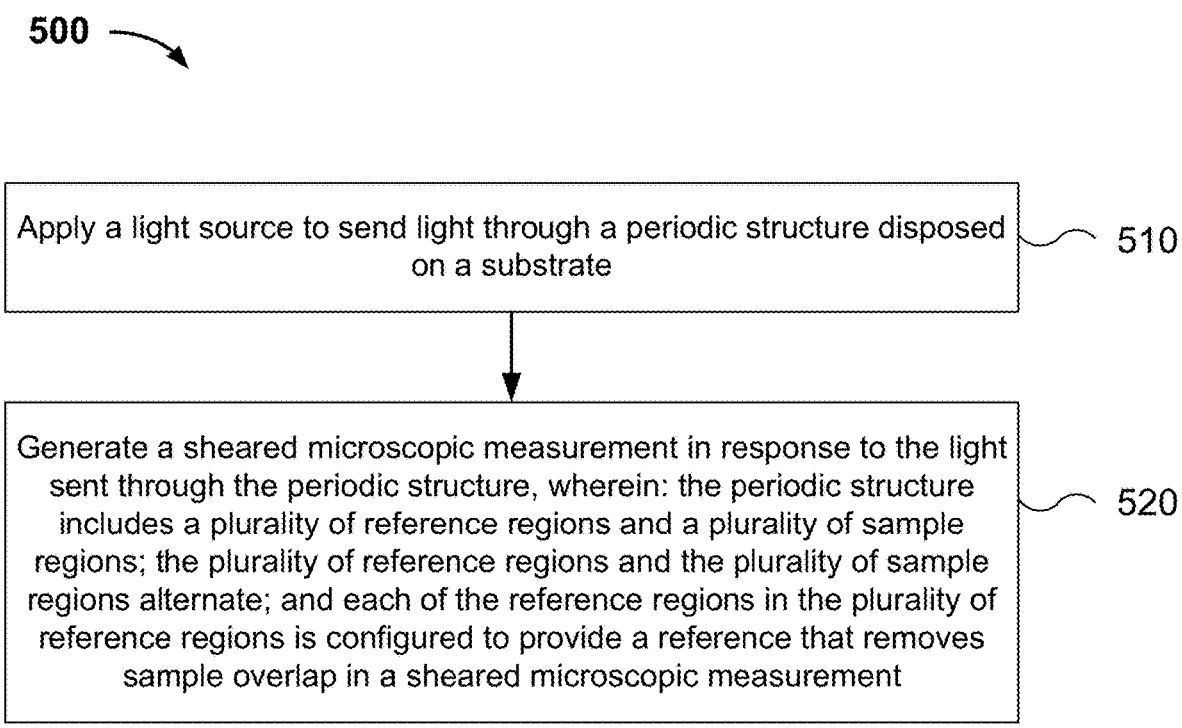
FIG. 5 shows a flowchart depicting an exemplary method for generating sheared microscopic measurements.

FIG. 5 shows a flowchart depicting an exemplary method 500 for generating sheared microscopic measurements. The method 500 comprises applying a light source to send light through a periodic structure disposed on a substrate at 510 and generating a sheared microscopic measurement in response to the light sent through the periodic structure at 520. In the example shown, the periodic structure includes a plurality of reference regions and a plurality of sample regions; the plurality of reference regions and the plurality of sample regions alternate; and each of the reference regions in the plurality of reference regions is configured to provide a reference that removes sample overlap in a sheared microscopic measurement.

In some embodiments, generating a sheared microscopic measurement comprises generating a laterally sheared interferogram using a lateral shearing interferometer. In some examples as described above, the reference regions and sample regions are parallel strips that extend along a length of the substrate, wherein each parallel strip is about equal in width as each of the other parallel strips, and wherein the reference regions are configured to provide planar references that remove sample overlap in a sheared microscopic measurement. In some cases and as discussed previously with respect to FIG. 3, a shear distance in the lateral shearing interferometer is an odd integer multiple (e.g., N*w, where N is an odd integer) of the width w of each strip.

In some embodiments, the shearing microscope slide is a fixed, prepared slide. As an example, a technique of preparing a shearing microscope slide such as slide 300 of FIG. 3 is discussed below with respect to FIGS. 6 and 7A-7D.

Figure 6:
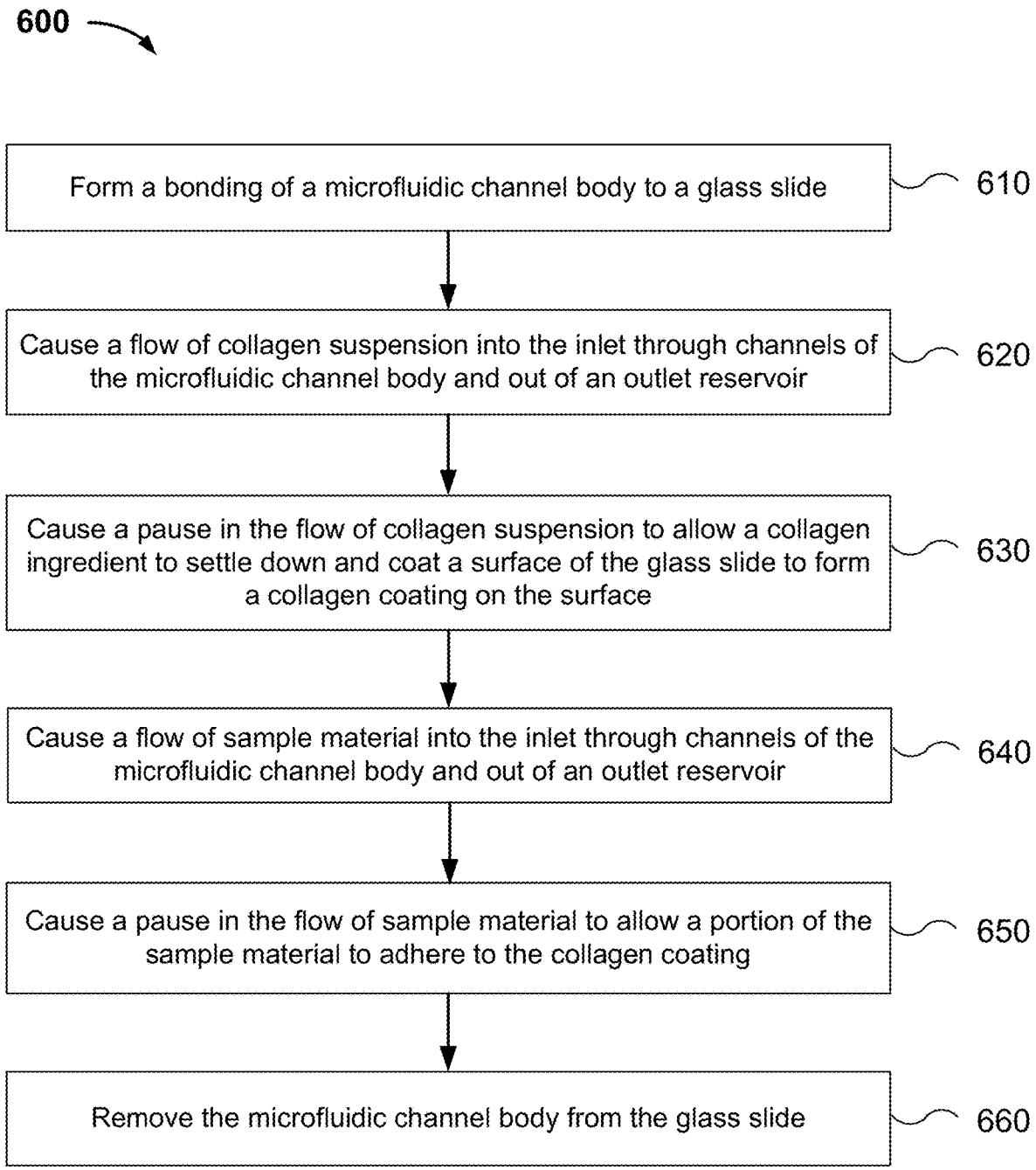
FIG. 6 shows a flowchart depicting an exemplary method of preparing a sheared microscopic slide.

FIG. 6 shows a flowchart depicting an exemplary method 600 of preparing a sheared microscopic slide. In the example shown, the method 600 comprises forming a bonding of a microfluidic channel body to a substrate at 610. In some cases, the substrate is a glass slide. In this case, the microfluidic channel body comprises an inlet reservoir configured to flow material into the microfluidic channel body and into a plurality of channels and an outlet reservoir configured to flow material out of the microfluidic channel body. The method 600 includes causing a flow of collagen suspension into the inlet through channels of the microfluidic channel body and out of an outlet reservoir at 620 and causing a pause in the flow of collagen suspension at 630 to allow a collagen ingredient to settle down and coat a surface of the substrate to form a collagen coating on the surface. In some embodiments, once a collagen coating has been formed on a surface of the substrate, the method 600 includes causing a flow of sample material into the inlet through channels of the microfluidic channel body and out of an outlet reservoir at 640 and causing a pause in the flow of sample material at 650 to allow a portion of the sample material to adhere to the collagen coating. Once the sample material has adhered to the collagen coating on the substrate, the microfluidic channel body is removed from the substrate at 660. In this manner, sample material is adhered to channels on the substrate, forming the desired sample regions or channels as described with respect to FIG. 3 above.

In some embodiments, the microfluidic channel body is a polydimethylsiloxane (PDMS) channel body and the bonding of a microfluidic channel body to a substrate (e.g., a glass slide) is formed by a reversible bonding of the PDMS channel body to the substrate. In some cases, the PDMS channel body is reusable and can be bonded and unbonded from a substrate to be reused on another substrate. Reversible bonding can be achieved with various methods (see, e.g. Chu M, etc., *Plasma free reversible and irreversible microfluidic bonding, Labchip,* 17(2): 267-273 (2017); Dinh T, etc., *Development of reversible bonding for microfluidic applications, Microfluidics and Nanofluidics,* 19(3): 751-756 (2015).

In some embodiments, a different substance other than collagen is caused to flow into the channel body to form a coating on a surface of the substrate exposed to the substance via the channels. The disclosed technique is not limited to the use of collagen to coat the sample regions or channels of the substrate and other materials or substances may be used so long as they provide a coating to which the sample material can adhere.

Additionally, a system for preparing a sheared microscopic slide is disclosed that can be used to perform the method 600 of FIG. 6 as described above. In some embodiments, the system comprises a microfluidic chip comprising a microfluidic channel body, an inlet configured to receive a material, and an outlet configured to release a portion of the material. In some cases, the microfluidic channel body comprises a plurality of parallel channels of about equal width for holding the material spaced by a plurality of intervals having of equal width, the width of each channel and the width of each interval being about equal. In some instances, the channel body is configured to reversibly bond to a substrate (e.g., a glass slide).

In some embodiments, the system also includes a flow control mechanism for controlling a flow of the material received through the inlet, moved through the plurality of parallel channels, and released through the outlet. In particular, the flow control mechanism is configured to: cause a flow of collagen suspension into the inlet through channels of the microfluidic channel body and out of an outlet; cause a pause in the flow of collagen suspension to allow a collagen ingredient to settle down and coat a surface of the glass slide to form a collagen coating on the surface; cause a flow of sample material into the inlet through channels of the microfluidic channel body and out of an outlet; and cause a pause in the flow of sample material to allow a portion of the sample material to adhere to the collagen coating.

A system for preparing a sheared microscopic slide and its various components as described above will now be discussed in further detail with respect to FIGS. 7A-7C and FIG. 8.

Figure 7A:
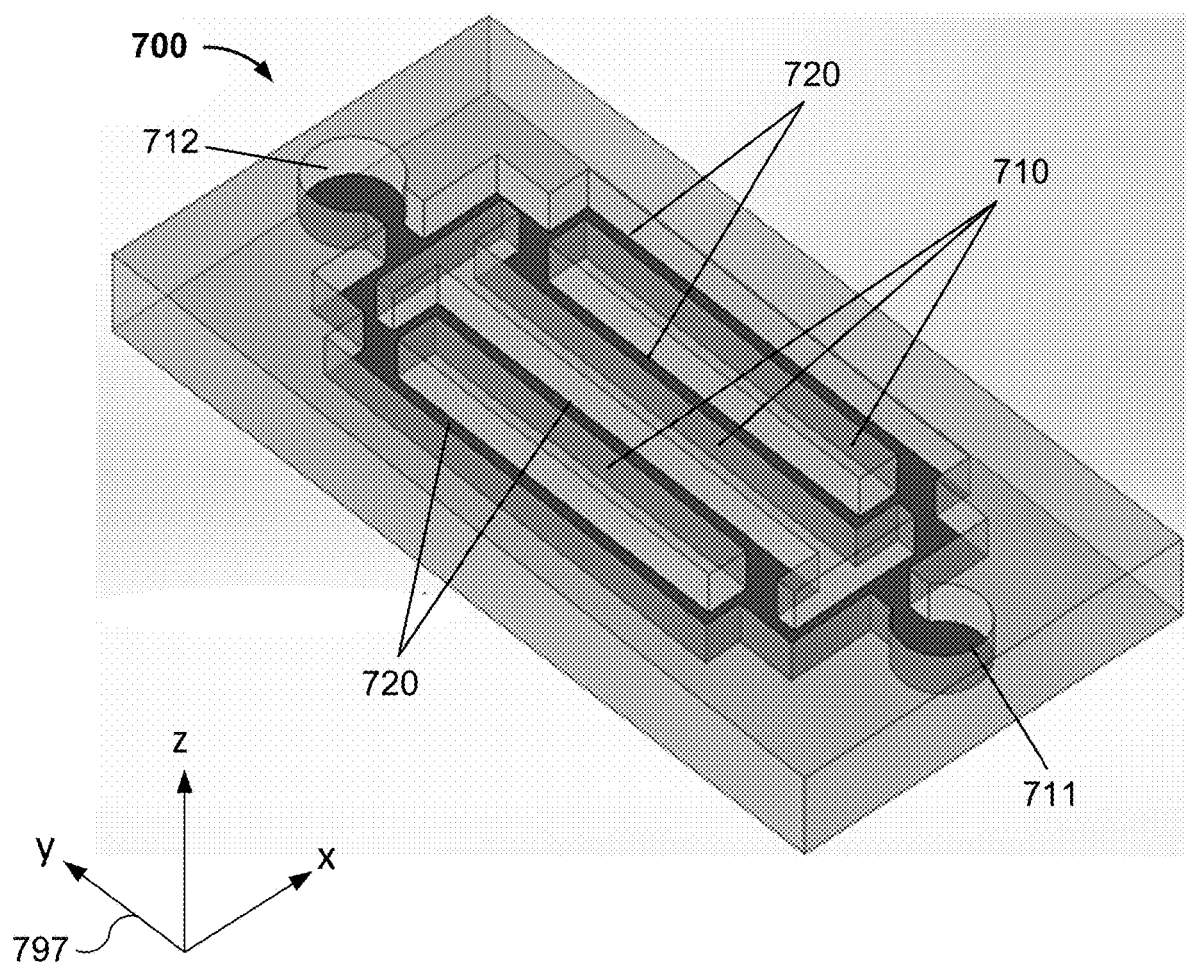
FIG. 7A shows a perspective view of an exemplary embodiment of a microfluidic channel body for use in a method and system for preparing a sheared microscopic slide.

FIG. 7A shows a perspective view of an exemplary embodiment of a microfluidic channel body 700 for use in a method and system for preparing a sheared microscopic slide as disclosed herein. In some embodiments, the microfluidic channel body 700 as depicted in FIG. 7A is fabricated using standard photolithography and soft lithography. In some cases, the microfluidic channel body is housed or contained on a reusable PDMS-based microfluidic chip. In some instances, the channel body is configured to reversibly bond to a glass slide. In this example, for reference purposes, a set of 3D primary axes is provided at 797.

As depicted in FIG. 7A, microfluidic channel body 700 includes an inlet 711 configured to receive a material, and an outlet 712 configured to release a portion of the material through inlet 711. Microfluidic channel body 700 also includes plurality of parallel channels 720 for holding the material. As shown in FIG. 7, each of the channels in the plurality of channels 720 is about equal in width and the channels are spaced apart by a plurality of intervals 710 also having about equal width. Note that the width of each channel and the width of each interval is shown to be about equal. Accordingly, the configuration of the microfluidic channel body 700 is designed to imprint a periodic structure having a plurality of alternating reference regions and sample regions that are parallel channels such that each channel is about equal in width as each of the other parallel channels.

Figure 7B:
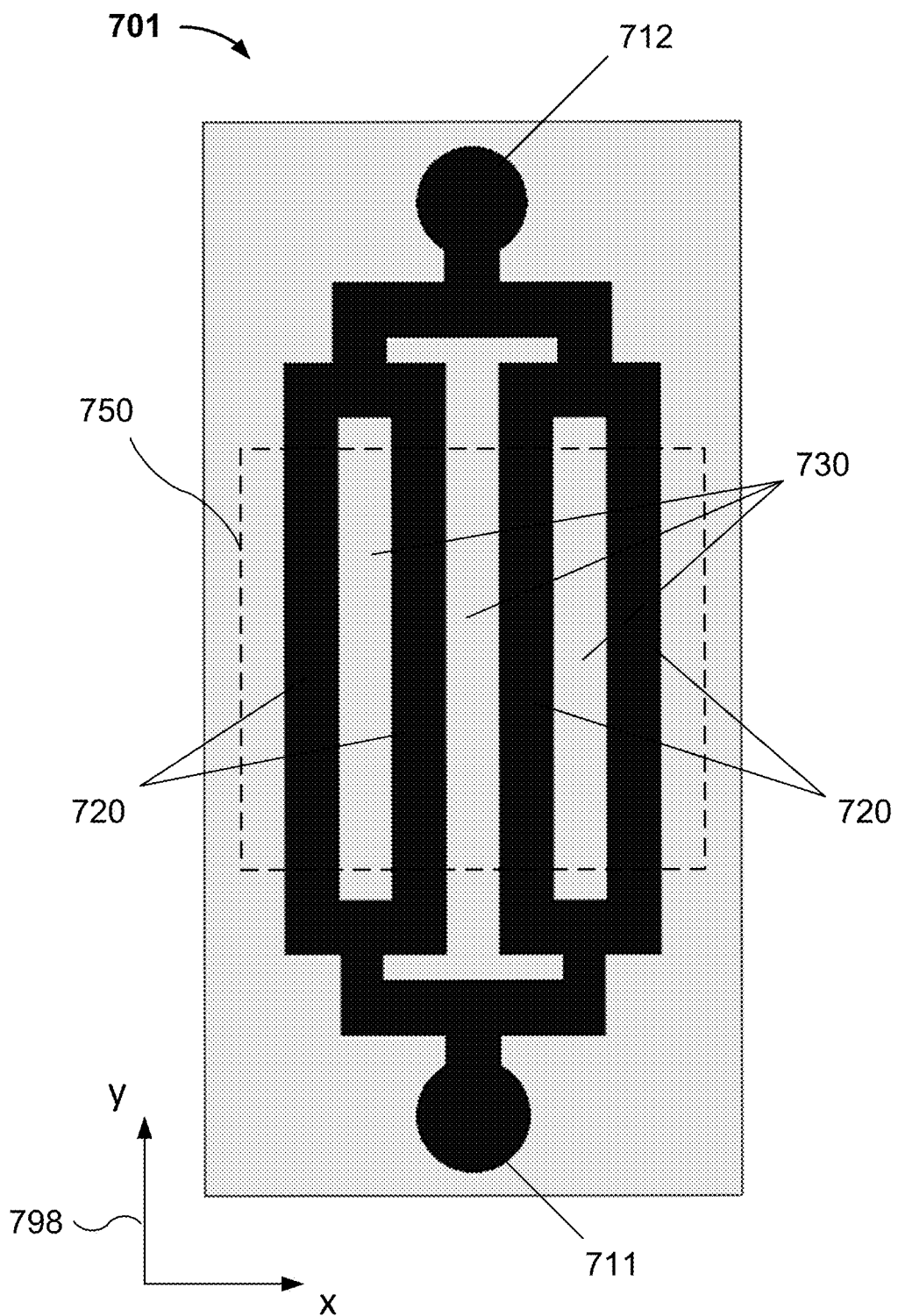
FIG. 7B shows a top view of a microfluidic channel layout for use in a method and system for preparing a sheared microscopic slide.

FIG. 7B shows a top view of a microfluidic channel layout 701 for use in a method and system for preparing a sheared microscopic slide as disclosed herein. A rectangular area delineated by a dashed box at 750 in FIG. 7B highlights the region of interest that can imprint or stamp a periodic structure on a glass slide having a plurality of alternating reference regions and sample regions that are parallel channels. The periodic structure in this case results from the fact that the width of the parallel channels 720 and intervals 710 between and separating the channels are about equal in the channel layout 701. In this example, for reference purposes, a set of 2D primary axes corresponding to the viewing plane is provided at 798.

Figure 7C:
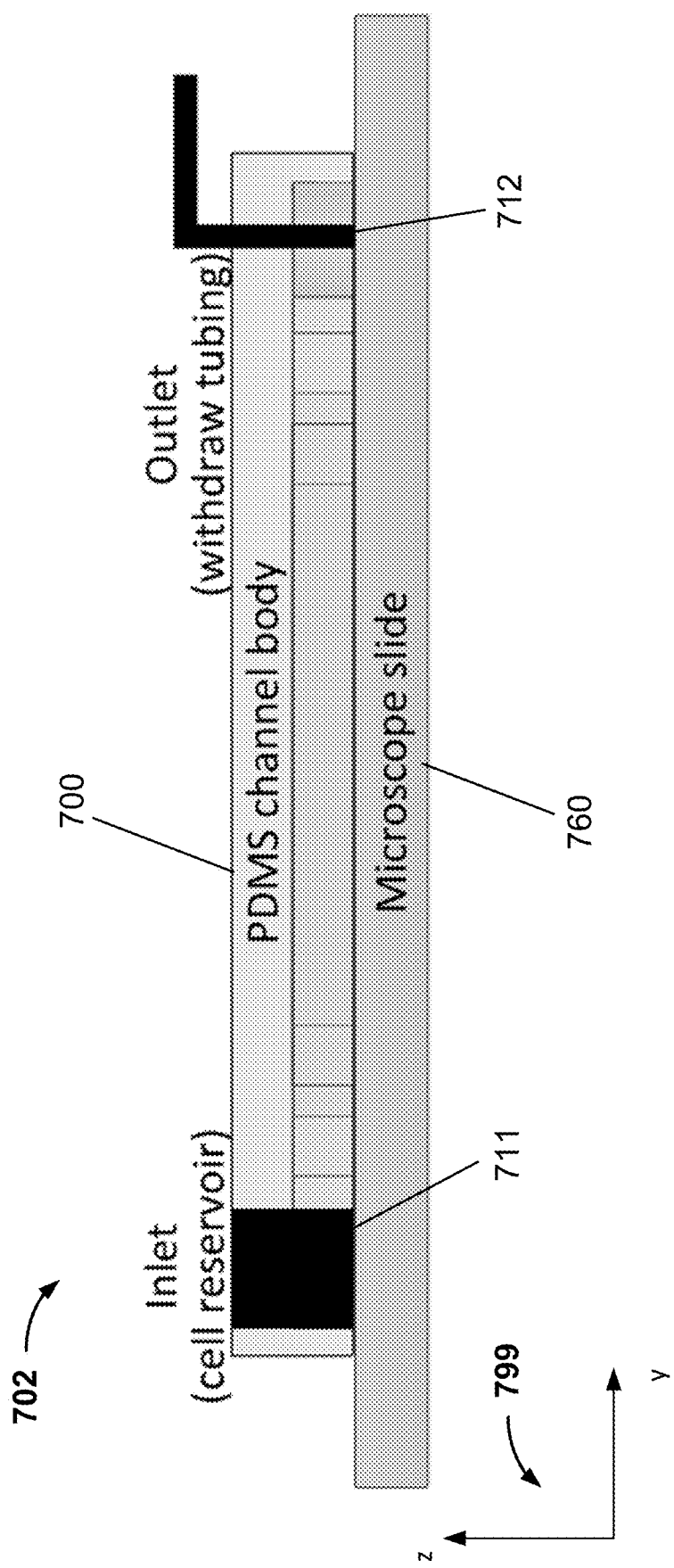
FIG. 7C shows a side or profile view of the exemplary embodiment of the microfluidic channel body of FIG. 7A.

FIG. 7C shows a side or profile view 702 of the exemplary embodiment of microfluidic channel body 700 of FIG. 7A. In this case, a bottom surface of microfluidic channel body 700, which in this case is PDMS channel body is shown to be bonded to a top surface of a microscope slide 760. Note that as described above, the bonding of the PDMS channel body and the glass slide is reversible to allow removal of the channel body once the glass slide has been imprinted with a desired sample in a periodic structure. Here, microscope slide 760 is the sheared microscopic slide as disclosed herein. Also depicted in this profile view 702 are the inlet 711 and the outlet 712. In this example, for reference purposes, a set of 2D primary axes corresponding to the viewing plane is provided at 799.

In some embodiments, a shearing microscope slide can be prepared through the following steps. A reversible bonding is formed of a PDMS channel body as depicted in FIGS. 7A-7C and a glass slide. The PDMS channel body includes an inlet, an outlet, and a plurality of parallel channels. A collagen suspension (or other substance to which a sample can adhere) is put into the inlet or cell reservoir (e.g., inlet 711 of FIGS. 7A-7C), wherein the inlet is configured to flow material into the PDMS channel body and into the plurality of channels. In some embodiments, the outlet includes an outlet tubing connected to a pump mechanism such as a syringe pump. The collagen suspension or other substance is withdrawn from the PDMS channel body to cause the collagen suspension or other substance to flow or migrate through each of the plurality of channels in the PDMS channel body. In some embodiments, the withdrawal process is performed manually using a manual pump while in other embodiments, an automated pumping mechanism is used such as a syringe pump to withdraw the collagen suspension or other substance into each channel. The withdrawing manner to drive the flow of collagen suspension or other substance is important because reversible microfluidic bonding usually cannot resist high pressure, and an appropriate withdrawing flow assures good seal in flow channels.

After an amount of collagen suspension or other substance sufficient to cover an area of the glass slide exposed in each channel has been achieved, the flow is paused or stopped for a period of time to allow a collagen ingredient (or other ingredient to which a sample can adhere) within the collagen suspension (or other substance) to settle down and coat the glass surface.

Once the glass surface has been coated with the collagen ingredient (or other ingredient), a sample of interest (e.g., a cell suspension) is put into the inlet and the sample is caused to flow into each of the plurality of channels using the same mechanism described above to withdraw the collagen suspension or other substance from the PDMS channel body. Specifically, the sample is withdrawn from the PDMS channel body to cause the sample to flow or migrate through each of the plurality of channels in the PDMS channel body. In some embodiments, the withdrawal process is performed manually using a manual pump while in other embodiments, an automated pumping mechanism is used such as a syringe pump to withdraw the sample into each channel.

After an amount of sample sufficient to cover an area of the glass slide exposed in each channel has been achieved, the flow of sample is paused or stopped for a period of time to allow objects of interest (e.g., cells suspended in the sample) within the sample to adhere on the coating (e.g., collagen or other ingredient for adhesion of cells) deposited on the glass surface.

Finally, as the bonding of the PDMS channel body to the glass slide is reversible, the PDMS channel body is removed by reversing the bonding and the glass slide is ready for use in a lateral shearing microscope. The PDMS channel body can be cleaned and reused for another preparation of a shearing microscope slide. Accordingly, the disclosed approach provides an easy, effective, and inexpensive way to prepare shearing microscope slides having the advantages described above.

FIG. 8 is a depiction of an exemplary embodiment of a microscope slide 800 prepared using the technique disclosed and described with respect to FIGS. 7A-7C. As shown in FIG. 8, the cells or objects of interest have been distributed or disposed on a periodic structure 802 having a plurality of reference regions 810 and a plurality of sample regions or measurement regions 820. In the example shown, the plurality of reference regions 810 and the plurality of sample regions or measurement regions 820 alternate and a boundary of the periodic structure 802 has been delineated by an imaging area 850 that corresponds to the imaging area 750 of FIG. 7B respectively. In this case, the alternating reference regions 810 and sample regions 820 are parallel strips or channels that extend along a length 840 of the slide 800 and each parallel strip or channel is about equal in width 830 as each of the other parallel strips or channels. In this example, for reference purposes, a set of 2D primary axes corresponding to the viewing plane is provided at 899.

As described in some of the embodiments above, one example of a shearing microscope slide is a fixed slide. In these cases, the sample material is fixed on the slide such that the objects of interest in the sample are in a fixed position or location on the slide and do not move with respect to the slide. Such a slide can be prepared by the exemplary method described with respect to FIGS. 7A-7C.

As an alternative, in other embodiments, a shearing microscope slide is configured to be connected to an external pumping mechanism that allows or provides a flow of sample material through channels of the slide. In these cases, the sample material flows through the slide and the objects of interest in the sample are migrating across the slide through the slide channels. Snapshots (e.g., interferograms) can be taken of an object of interest such as a cell at different points in time and at different locations on the slide channel as the object migrates across the slide to generate a set of snapshots of the same object at the different locations on the slide. This provides an advantage of being able to continuously observe objects of interest in a sample without having to prepare a number of fixed sample slides. Additionally, as discussed in further detail below, this slide configuration and measurement technique provides other advantages and benefits as well.

Recall that a goal of interferometry is to recover the phase map from the interferogram in order to determine various properties of objects of interest being measured or analyzed. One way to recover the phase map in two-beam shearing interferometers is to introduce tilt between the two beams and use a spatial heterodyne interferometry to recover the phase map across the resulting image or interferogram with a single measurement. The spatial heterodyne interferometry technique for recovering the phase map applies a Fourier transform to the interferogram followed by filtering (e.g., bandpass filtering) to select a portion of the Fourier transform around a spatial frequency f of the tilt fringes, and then taking an inverse Fourier transform around the spatial frequency. This technique can be useful for samples that change in time, such as the flow case described above. But a tradeoff of this approach is that spatial resolution is decreased during the Fourier transform and filtering operations used in spatial heterodyne interferometry. A more detailed discussion of this technique can be found in *Field Guide to Interferometric Optical Testing, SPIE Field Guides, Volume FG*10, by Eric P. Goodwin and James C. Wyant (2006), the entirety of which is incorporated herein by reference.

One way around the problem of decreased spatial resolution resulting from the application of spatial heterodyne interferometry is to instead apply a technique of temporal phase shifting using a shearing microscope slide configured for this purpose and described with respect to the following figures.

Figure 9A:
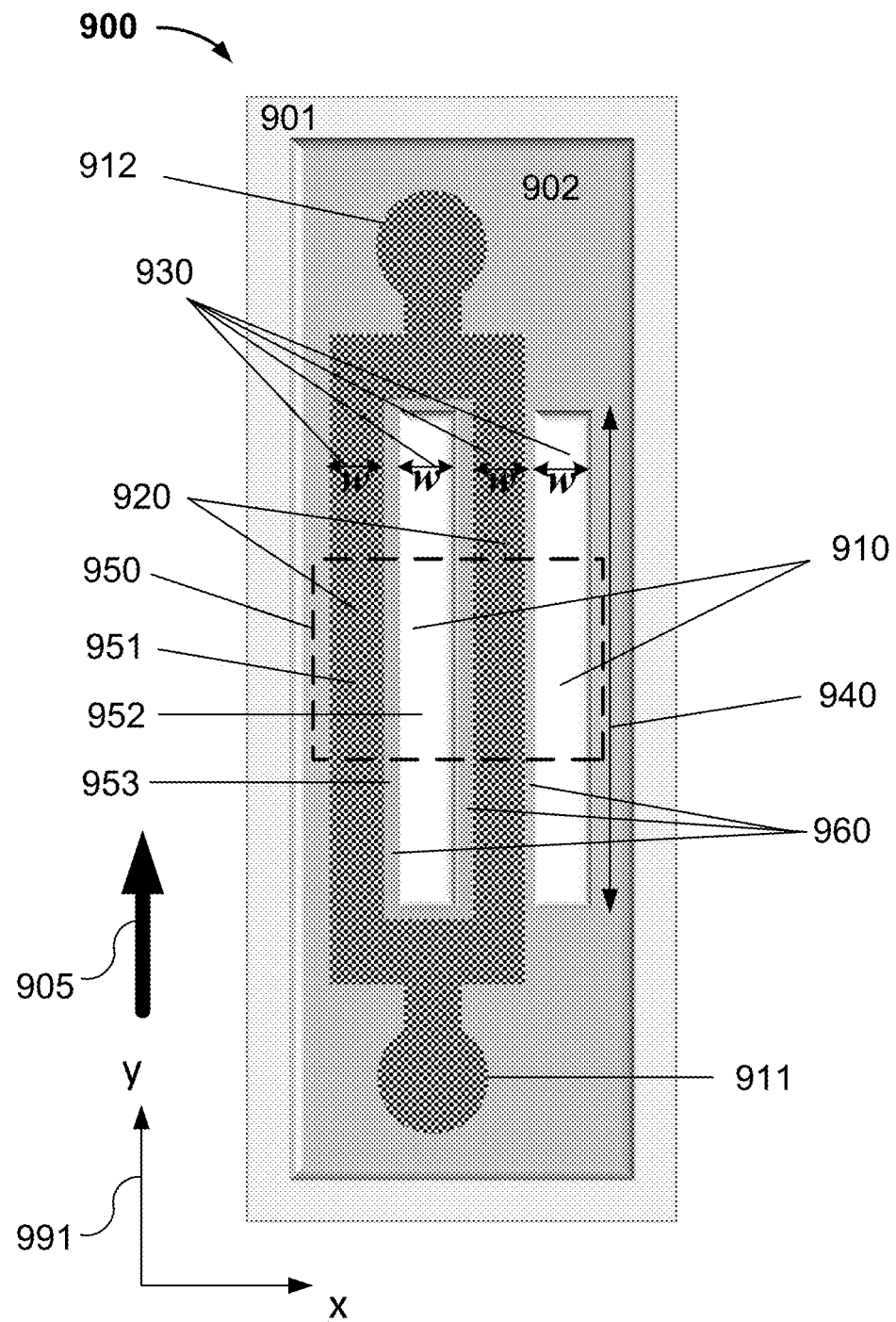
FIG. 9A depicts an embodiment of a system for generating sheared microscopic measurements that accommodates a flow of sample material and enables temporal phase shifting with improved spatial resolution.

FIG. 9A depicts an embodiment of a system 900 for generating sheared microscopic measurements that accommodates a flow of sample material and enables temporal phase shifting with improved spatial resolution. In this example, the system 900 comprises a substrate 901 (e.g., a glass slide) and a periodic structure 902 disposed on the substrate 901. In the example shown, an inlet 911 disposed on the substrate 901 is configured to receive a material comprising a plurality of objects to be measured. Additionally, an outlet 912 disposed on the substrate 901 is configured to release a portion of the material.

The periodic structure 902 shown in FIG. 9A includes a plurality of reference channels 910 and a plurality of sample channels 920. In this example, each sample channel in the plurality of sample channels 920 is configured to accommodate a flow of the material from the inlet 911 to the outlet 912 with a direction of material flow 905 (flow direction) proceeding along the y-axis in a direction y. Each reference channel in the plurality of reference channels 910 is configured to provide a reference that removes sample overlap in a sheared microscopic measurement. In the example shown, the reference channels are air channels that contain air, but the reference channels can comprise or hold other materials or fluids such as saline. As shown in FIG. 9A, the plurality of reference channels 910 and the plurality of sample channels 920 alternate. For reference purposes, a set of 2D primary axes corresponding to the viewing plane is provided at 991.

In some embodiments, the objects to be measured comprise cells and the sheared microscopic measurement comprises a laterally sheared interferogram generated by a lateral shearing interferometer. In the example of FIG. 9A, the plurality of reference channels 910 and the plurality of sample channels 920 extend along a length 940 of the structure and each reference channel and each sample channel is about equal in a width w (shown at 930) to each of the other reference channels and each of the other sample channels. In the example shown, channels are separated from each other by walls 960. As an example, sample channel 951 and reference channel 952 are separated by a wall at 953. In other embodiments, a shear distance in the lateral shearing interferometer is an odd integer multiple of the width w at 930 of each reference channel and each sample channel. In some cases, the reference channels 910 are configured to provide planar references that remove sample overlap in the sheared microscopic measurement.

In some embodiments, the periodic structure is a polydimethylsiloxane (PDMS) structure and a bonding of the periodic structure to a substrate (e.g., a glass slide) is formed by a bonding of the PDMS structure to the substrate. In some cases, the PDMS structure is formed using a 3D printing process. Note that each of the reference channels and each of the sample channels is an independent channel separated in this example by walls in the periodic structure (e.g., PDMS walls) 960 in between two adjacent channels that separate the two adjacent channels.

Typically, to recover a phase map using an approach of adding a successive phase change requires four measurements of the same object having different phases. Note that in this case, due to the slide configuration having alternating reference channels or regions and sample channels or regions at a 50% duty cycle, each sample region is interfered with two different reference regions simultaneously, so it is already measured twice (see, e.g., FIG. 4). If the sample is flowing through the channels, there are various ways the phase shifting measurement can be made.

One way is to make the reference regions have an optical path length (OPL) variation along the y direction. In this case, as the sample flows (e.g., along a direction y as shown at 905), it is interfered with a reference signal with varying phase, allowing phase shifting. The phase change does not have to be an exact value, as LSPSI (Least Squares Phase Shifting Interferometry) or other techniques can be used to calculate the phase of the measurement regions. The OPL can be varied by having a changing thickness along y (see, e.g., the set of axes at 991), or by having a constant thickness but a varying proportion of high and low refractive index materials (e.g., two opposing wedges) built into the reference channel. Alternatively, every other reference region (e.g., the odd regions) can have a thickness offset relative to the remaining regions (e.g., the even regions), so that only two measurements in time are needed to get the four measurements needed to do phase shifting.

Accordingly, in some cases, the reference channels 910 are configured to have an optical path length variation along a direction y of material flow (e.g., a flow direction 905 as shown in FIG. 9A). For example, the reference channels are configured to have an optical path length variation along a direction y of material flow by changing a thickness of each of the reference channels along a direction y of material flow.

More specifically, in order to improve the spatial resolution of sheared microscopic measurements in a shearing microscope slide, temporal phase shifting is enabled by introducing optical path length variation in sloped reference regions along the sample flow direction. By taking a series of measurements or snapshots (e.g., interferograms) of an object (e.g. a cell) as it migrates through a sample flow channel, a phase change is added to each successive snapshot being taken when the object is in a position corresponding to an increased thickness of the reference region.

In this case, an optical path length variation along a direction of material flow is due to a thickness or height change of the reference regions 910 of the structure 902. More specifically, although not visible in the top view shown in FIG. 9A, the reference regions or channels 910 are sloped to increase gradually in thickness along a direction of material flow.

Figure 9B:
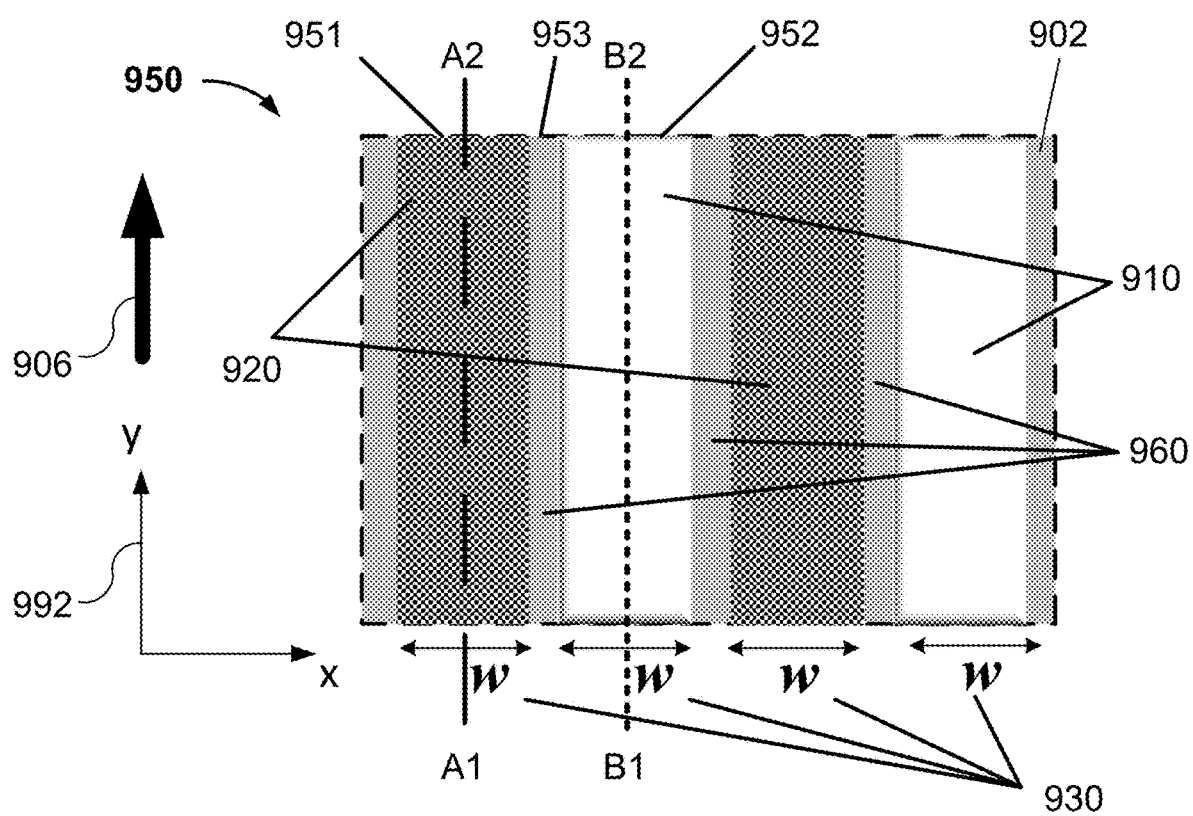
FIG. 9B depicts a top view of an area of the periodic structure shown in FIG. 9A wherein cross sections (depicted in FIG. 9C) are shown to be taken along a y direction.

FIG. 9B is a depiction of a top view of an area 950 of the periodic structure 902 shown in FIG. 9A comprising a plurality of reference channels 910 and a plurality of sample channels 920, wherein cross sections (depicted below in FIG. 9C) are shown to be taken along a y direction. In this case, channels are separated from each other by walls 960. As an example, sample channel 951 and reference channel 952 are separated by a wall at 953 (e.g., a PDMS wall).

Reference channel 952 has an optical path length variation along a direction of material flow 906. Each reference channel and each sample channel is about equal in a width w (shown at 930). For reference purposes, a set of 2D primary axes is provided at 992 with the direction of material flow 906 (flow direction) proceeding along the y-axis in a direction y and a width w of the reference region or channel of the slide indicated along the x-axis in a direction x. A cross-section is taken of the sample channel 951 along an axis in the y direction designated by endpoints A1 and A2 and a cross-section is taken of the reference channel 952 along an axis in the y direction designated by endpoints B1 and B2. These cross-sectional views of the sample channel 951 and the reference channel 952 are depicted in and described with respect to FIG. 9C.

Figure 9C:
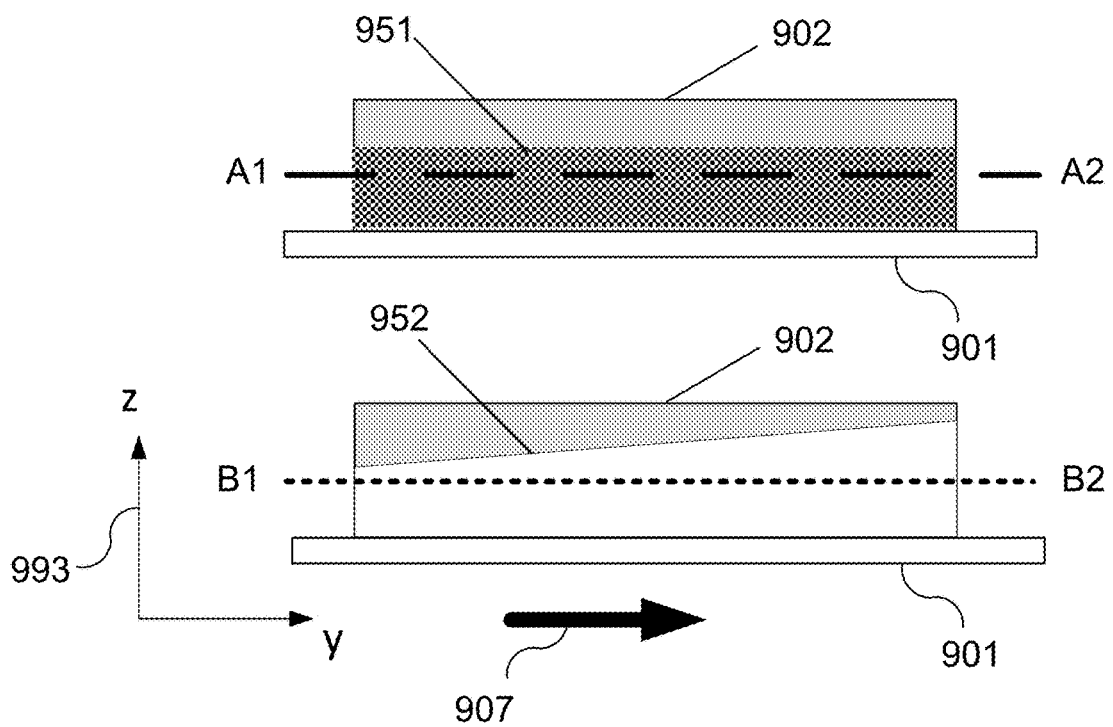
FIG. 9C depicts a cross-section or profile view taken along a y direction showing the height profiles of a sample channel and a reference channel in the area of the periodic structure shown in FIG. 9B.

FIG. 9C is a depiction of a cross-section or profile view showing the height profiles of sample channel 951 (wherein a cross-section is taken along an axis in the y direction designated by endpoints A1 and A2) and reference channel 952 (wherein a cross-section is taken along an axis in the y direction designated by endpoints B1 and B2). For reference purposes, a set of 2D primary axes is provided at 993 with the direction of material flow 907 (flow direction) proceeding along the y-axis in a direction y and the thickness or height of the reference region or channel of the slide indicated along the z-axis in a direction z. As shown in FIG. 9C, the sample channel is a constant height along the y direction while the reference channel is sloped along the y direction.

Although the thickness or height change is greatly exaggerated for illustrative purposes, the reference channel 952 is configured to increase gradually in thickness or height in z along the y-axis in a material flow direction y from an input (e.g., inlet 911 of FIG. 9A) to an output (e.g., outlet 912 of FIG. 9A). The gradual increase in thickness or height of the reference channel (e.g., air channel) as shown by the upward slope in its height profile moving from left to right in FIG. 9C along the y-axis results in an optical path length variation for light applied through the slide as the light passes through different thicknesses of the reference channel along the y-axis in a material flow direction y, wherein a fluid (e.g., air) or other material is disposed in the reference channel.

Figure 9D:
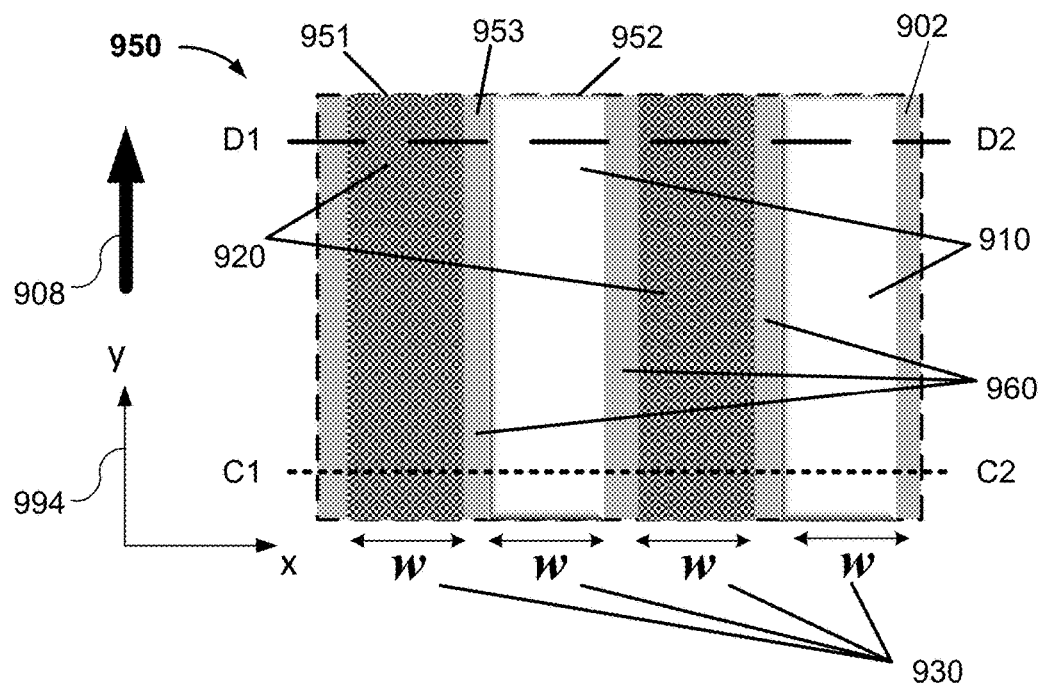
FIG. 9D depicts a top view of an area of the periodic structure shown in FIG. 9A wherein cross sections (depicted in FIG. 9E) are shown to be taken along an x direction.

FIG. 9D is a depiction of a top view of an area 950 of the periodic structure 902 shown in FIG. 9A comprising a plurality of reference channels 910 and a plurality of sample channels 920, wherein cross sections (depicted below in FIG. 9E) are shown to be taken along an x direction. In this case, channels are separated from each other by walls 960. As an example, sample channel 951 and reference channel 952 are separated by a wall at 953 (e.g., a PDMS wall).

In this example, reference channel 952 has an optical path length variation along a direction of material flow 908. Each reference channel and each sample channel is about equal in a width w (shown at 930). For reference purposes, a set of 2D primary axes is provided at 994 with the direction of material flow 908 (flow direction) proceeding along the y-axis in a direction y and a width w of the reference region or channel of the slide indicated along the x-axis in a direction x. Additionally, a first cross-section is taken of the area 950 of the periodic structure along an axis in the x direction designated by endpoints C1 and C2 at a first location in y closer or proximal to the inlet and a second cross-section is taken of the area 950 of the periodic structure along an axis in the y direction designated by endpoints D1 and D2 at a second location in y closer or proximal to the outlet. These cross-sectional views of the area 950 at the first and second locations are depicted in and described with respect to FIG. 9E.

Figure 9E:
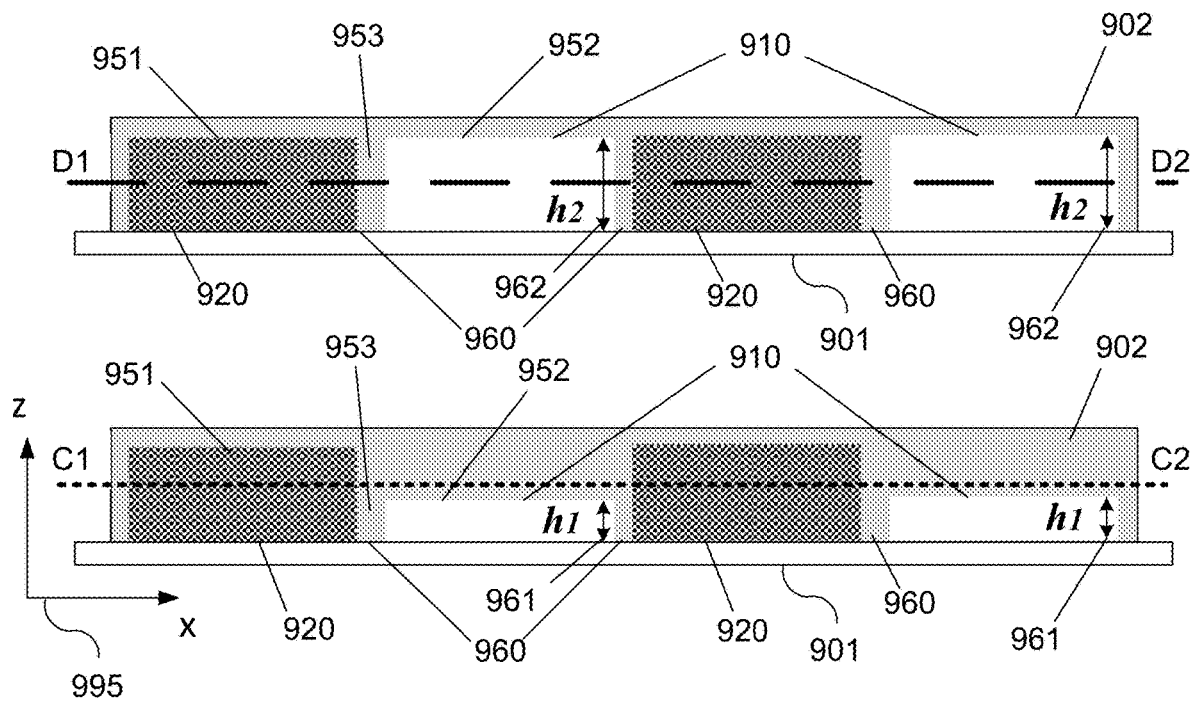
FIG. 9E depicts a cross-section or profile view taken along an x direction at a first location and a second location of the area of the periodic structure shown in FIG. 9D.

FIG. 9E is a depiction of a cross-section or profile view of the area 950 of the periodic structure 902 disposed on substrate 901 at a first location designated by endpoints C1 and C2 and at a second location designated by endpoints D1 and D2. For reference purposes, a set of 2D primary axes is provided at 995 with the thickness or height of the reference region or channel of the slide indicated along the z-axis in a direction z. The periodic structure 902 comprises a plurality of reference channels 910 and a plurality of sample channels 920. In the example shown, channels are separated from each other by walls 960. As an example, sample channel 951 and reference channel 952 are separated by a wall at 953.

Although the thickness change is greatly exaggerated for illustrative purposes, the reference regions or channels 910 are configured to increase gradually in thickness along the y-axis in a direction y from an input (e.g., inlet 911 of FIG. 9A) to an output (e.g., outlet 912 of FIG. 9A). In FIG. 9E, this gradual increase in thickness of the reference regions or channels 910 (e.g., air channel) along the y-axis in a direction y is shown by a height difference of the reference channels 910 at the two cross-section locations. In particular, the reference channels 910 are at a height $h_1$ at 961, taken at the cross section of the first location designated by endpoints C1 and C2 and are at a different height $h_2$ at 962, taken at the cross section of the second location designated by endpoints D1 and D2. In this case, since the height of the reference channels is increasing, we see that $h_2$ is greater than $h_1$. In contrast, in this example, the height of the sample channels 920 remains constant. In some embodiments (not shown), where the height of the reference channel is decreasing along a direction of material flow, $h_2$ would be less than $h_1$. As described above, the gradual increase in height of the reference channel results in an optical path length variation for light applied through the slide as the light passes through different thicknesses of the reference channel along the y-axis in a direction y.

FIGS. 9A-9E depict an embodiment of a system for generating sheared microscopic measurements comprising a periodic structure having a plurality of sample channels and a plurality of reference channels disposed near a surface where the periodic structure (e.g., a PDMS structure) meets or is bonded to a substrate (e.g., a glass slide). In the embodiment shown in FIGS. 9A-9E, a top surface of the periodic structure 902 remains flat while the channels (e.g., channels 910 and 920) are carved into or formed from recessed regions set in a bottom surface of the periodic structure that meets with a top surface of the substrate. Note that, although reference channels 910 and sample channels 920 are depicted as rectangular columns along a direction y, in some embodiments the profile of one or more of the reference channels or sample channels has various shapes. For example, the profile can be dome-shaped, circular, square, triangular, or any other polygon or curved-edged profile shape that provides a path for material to flow through a sample channel or alternatively, that provides a configuration for a reference channel that removes sample overlap in a sheared microscopic measurement. In some embodiments, the periodic structure comprises references channels formed as recesses or grooves on a top surface of the structure instead of on the bottom surface where the structure meets a top surface of the substrate, as will be described in more detail below.

Figure 10A:
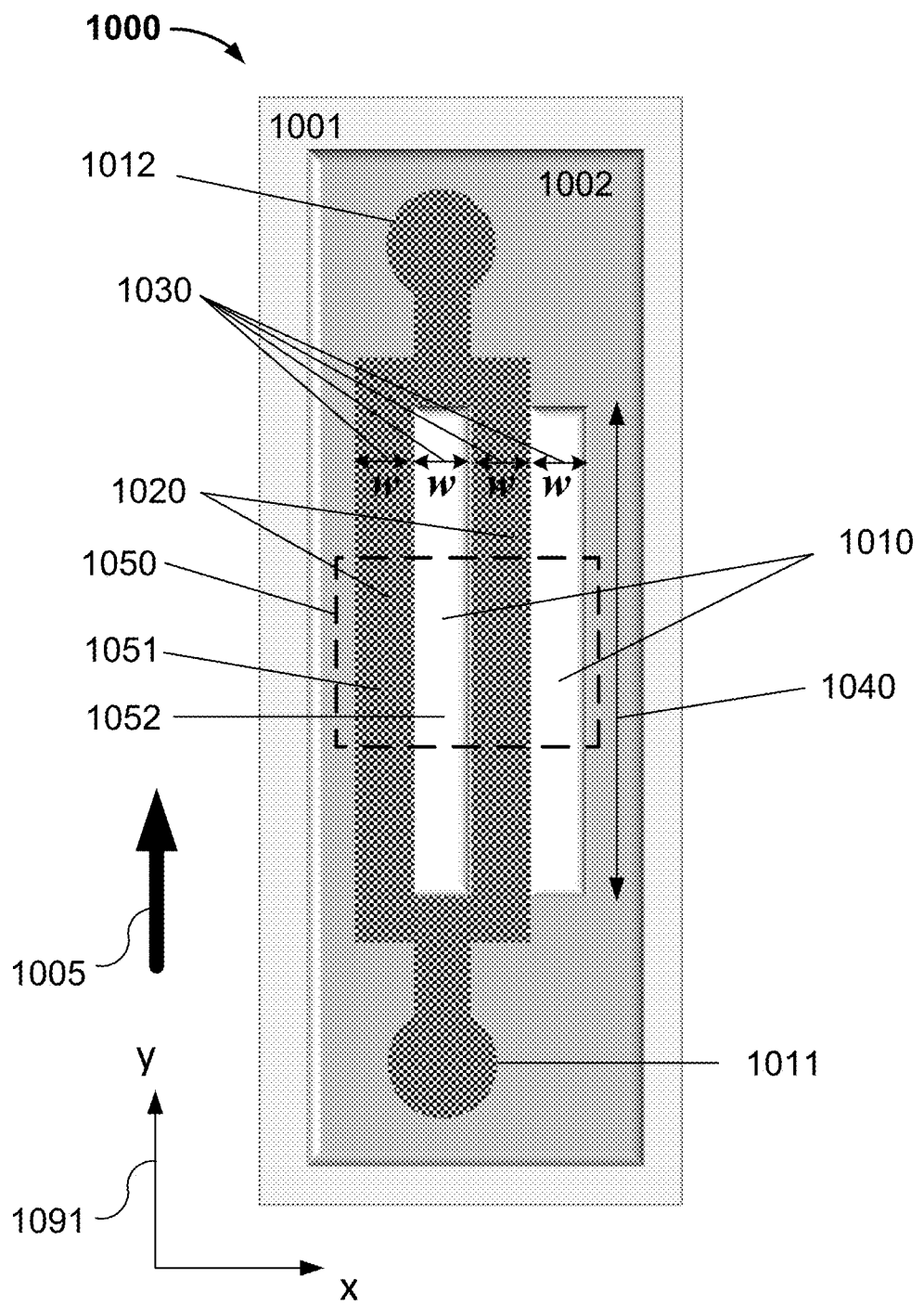
FIG. 10A depicts an embodiment of a system for generating sheared microscopic measurements comprising a periodic structure having reference channels formed by grooves or recessed regions on a top surface of the structure.

FIG. 10A depicts an embodiment of a system 1000 for generating sheared microscopic measurements comprising a periodic structure having reference channels formed by grooves or recessed regions carved into, set within, or disposed on a top surface of the structure. In this example, the system 1000 comprises a substrate 1001 (e.g., a glass slide) and a periodic structure 1002 disposed on the substrate 1001. As in the example of FIG. 9A, an inlet 1011 disposed on the substrate 1001 is configured to receive a material comprising a plurality of objects to be measured. Additionally, an outlet 1012 disposed on the substrate 1001 is configured to release a portion of the material.

The periodic structure 1002 shown in FIG. 10A includes a plurality of reference channels 1010 and a plurality of sample channels 1020. Each sample channel in the plurality of sample channels 1020 is configured to accommodate a flow of the material from the inlet 1011 to the outlet 1012 with a direction of material flow 1005 (flow direction) proceeding along the y-axis in a direction y. Each reference channel in the plurality of reference channels 1010 is configured to provide a reference that removes sample overlap in a sheared microscopic measurement. In this case, the reference channels are air channels that contain air, but in other embodiments the reference channels can be configured to hold other materials or fluids. Additionally, as shown in FIG. 10A, the plurality of reference channels 1010 and the plurality of sample channels 1020 alternate and each reference channel and each sample channel is about equal in a width w (shown at 1030). For reference purposes, a set of 2D primary axes corresponding to the viewing plane is provided at 1091.

In some embodiments, the objects to be measured comprise cells and the sheared microscopic measurement comprises a laterally sheared interferogram generated by a lateral shearing interferometer. In the example of FIG. 10A, the plurality of reference channels 1010 and the plurality of sample channels 1020 extend along a length 1040 of the structure and each reference channel and each sample channel is about equal in a width w (shown at 1030) to each of the other reference channels and each of the other sample channels. In other embodiments, a shear distance in the lateral shearing interferometer is an odd integer multiple of the width w at 1030 of each reference channel and each sample channel. In some cases, the reference channels 1010 are configured to provide planar references that remove sample overlap in the sheared microscopic measurement.

Unlike the embodiment of system 900 shown in FIGS. 9A-9E, the embodiment of system 1000 of FIG. 10A does not include walls in the periodic structure to separate two adjacent channels. In this case, because the reference channels are configured to be carved into, set within, or disposed on a top surface of the structure while the sample channels are configured to be on a bottom surface of the structure, in embodiments where the structure is thicker than the sum of heights (or depths) of sample and reference channels, there is no need to include walls to separate reference and sample channels. In particular, the areas of walls (e.g., a top surface of the walls as seen from a top view of the periodic structure) will not generate valid data, resulting in a loss in the field of view or a smaller effective field of view. Thus, the configuration depicted and described with respect to FIG. 10A that does not include walls to separate adjacent channels or regions provides certain advantages. In this case, a structure as shown in FIG. 10A having no walls to separate adjacent channels and no gap between sample and reference channels, is configured to provide no loss in the field of view and therefore has a larger effective field of view as compared with a structure that includes walls.

In some embodiments, the periodic structure is a polydimethylsiloxane (PDMS) structure and a bonding of the periodic structure to a substrate (e.g., a glass slide) is formed by a bonding of the PDMS structure to the substrate. In some cases, the PDMS structure is formed using a 3D printing process.

In some cases, the reference channels 1010 are configured to have an optical path length variation along a direction y of material flow (e.g., a flow direction 1005 as shown in FIG. 10A). For example, the reference channels are configured to have an optical path length variation along a direction y of material flow by changing a thickness of each of the reference channels along a direction y of material flow.

In this case, an optical path length variation along a direction of material flow is due to a thickness or depth change of the reference regions or channels 1010 of the structure 1002. More specifically, although not visible in the top view shown in FIG. 10A, the reference regions or channels 1010 are grooves set in a top surface of the structure 1002 having a slope so as to increase gradually in depth along a direction of material flow.

Figure 10B:
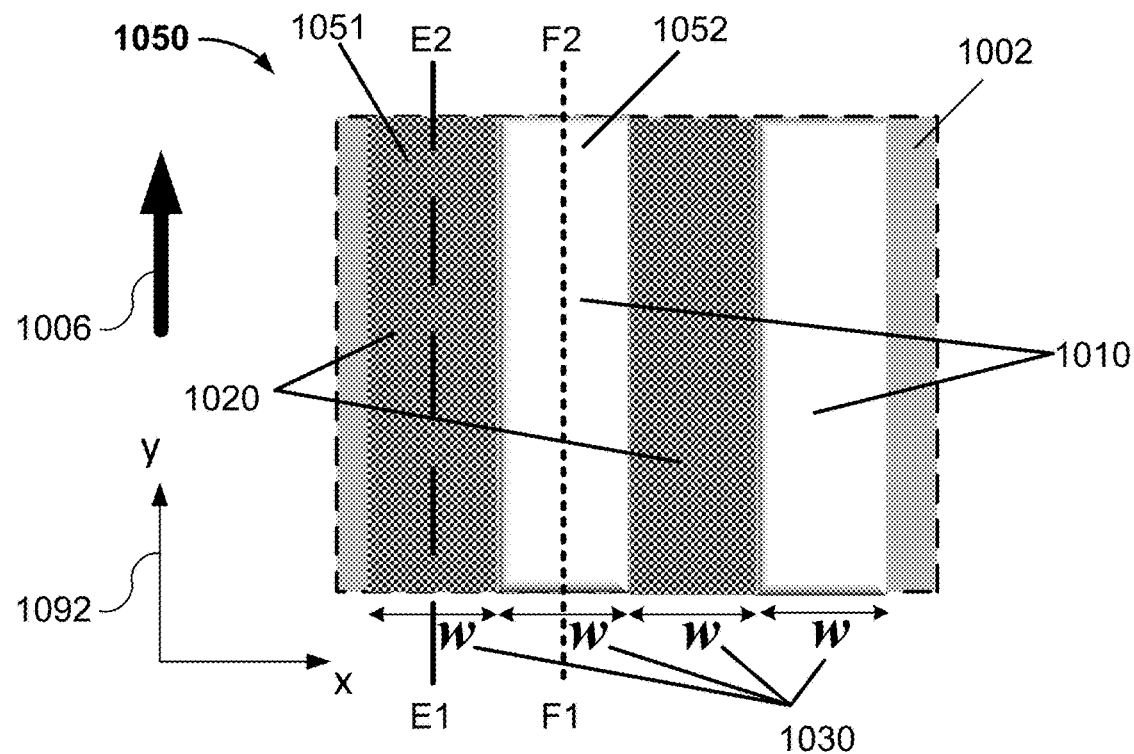
FIG. 10B depicts a top view of an area of the periodic structure shown in FIG. 10A wherein cross sections (depicted in FIG. 10C) are shown to be taken along a y direction.

FIG. 10B is a depiction of a top view of an area 1050 of the periodic structure 1002 shown in FIG. 10A comprising a plurality of reference channels 1010 and a plurality of sample channels 1020, wherein cross sections (depicted in FIG. 10C) are shown to be taken along a y direction. In this case, the periodic structure includes sample channel 1051 and reference channel 1052 (shown in FIGS. 10A and 10B). In this example, reference channel 1052 has an optical path length variation along a direction of material flow 1006. Each reference channel and each sample channel is about equal in a width w (shown at 1030). For reference purposes, a set of 2D primary axes is provided at 1092 with the direction of material flow 1006 (flow direction) proceeding along the y-axis in a direction y and a width w of the reference region or channel of the slide indicated along the x-axis in a direction x. Additionally, a cross-section is taken of the sample channel 1051 along an axis in they direction designated by endpoints E1 and E2 and a cross-section is taken of the reference channel 1052 along an axis in the y direction designated by endpoints F1 and F2. These cross-sectional views of the sample channel 1051 and the reference channel 1052 are depicted in and described with respect to FIG. 10C.

Figure 10C:
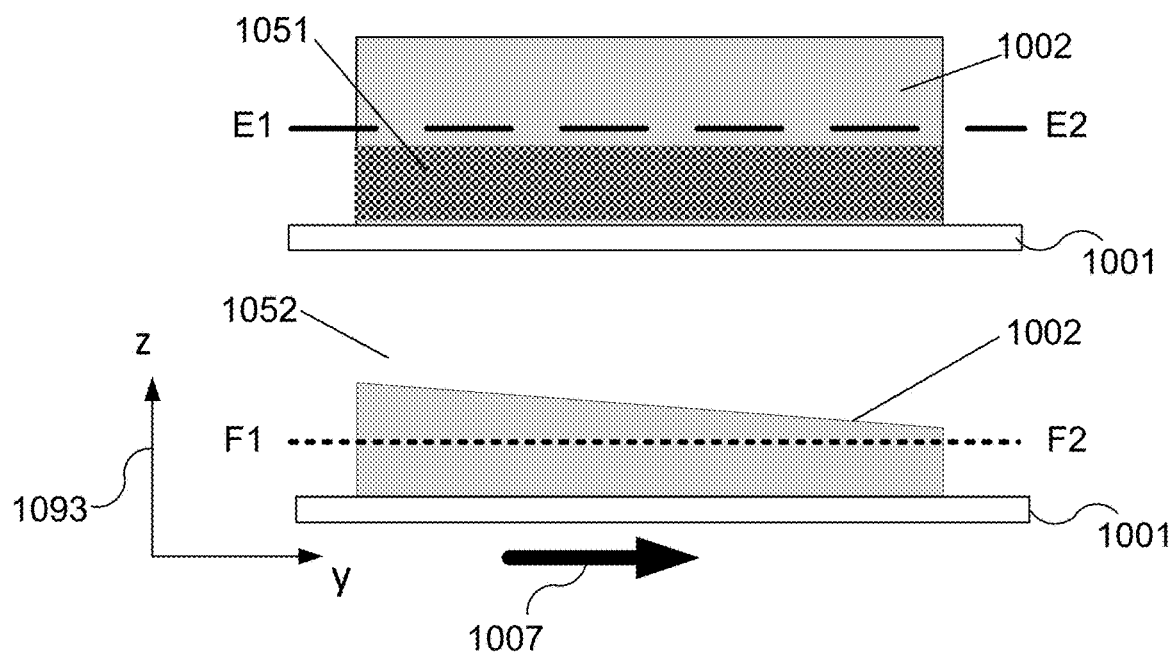
FIG. 10C depicts a cross-section or profile view taken along a y direction showing the height profiles of a sample channel and a reference channel in the area of the periodic structure shown in FIG. 10B.

FIG. 10C is a depiction of a cross-section or profile view of showing the height profiles of sample channel 1051 (wherein a cross-section is taken along an axis in the y direction designated by endpoints E1 and E2) and reference channel 1052 (wherein a cross-section is taken along an axis in the y direction designated by endpoints F1 and F2). For reference purposes, a set of 2D primary axes is provided at 1093 with the direction of material flow 1007 (flow direction) proceeding along the y-axis in a direction y and the thickness or height of the reference region or channel of the slide indicated along the z-axis in a direction z. As shown in FIG. 10C, in this case the sample channel is a constant height along the y direction while the reference channel, comprising a groove or recess in a top surface of the periodic structure, is shown here as an air channel disposed above the surface of the periodic structure 1002, wherein a changing depth in the reference channel is provided by a downward slope in the periodic structure 1002 along the y direction.

Although the thickness or depth change is greatly exaggerated for illustrative purposes, the reference channel 1052 is configured to increase gradually in thickness or depth in z along the y-axis in a material flow direction y from an input (e.g., input 1011 of FIG. 10A) to an output (e.g., output 1012 of FIG. 10A). The gradual increase in thickness or depth of the reference channel (e.g., air channel) as shown by the downward slope in its depth profile moving from left to right in FIG. 10C along the y-axis in results in an optical path length variation for light applied through the slide as the light passes through different thicknesses of the reference channel along the y-axis in a material flow direction y.

Figure 10D:
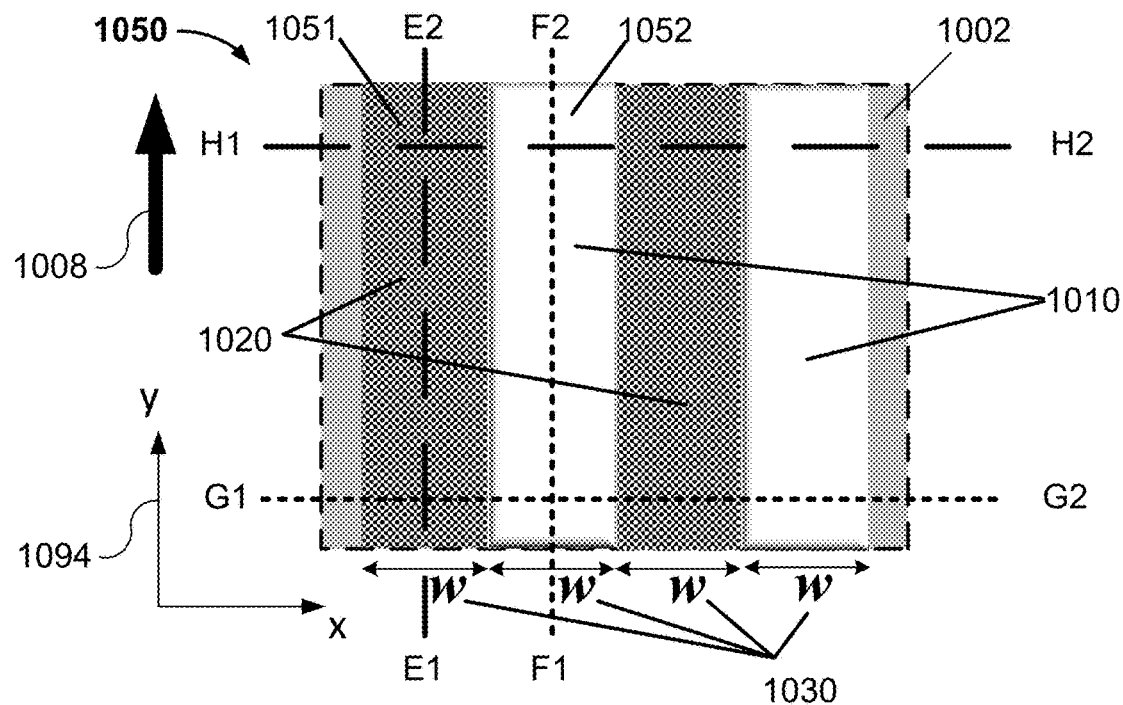
FIG. 10D depicts a top view of an area of the periodic structure shown in FIG. 10A wherein cross sections (depicted in FIG. 10E) are shown to be taken along an x direction.

FIG. 10D is a depiction of a top view of an area 1050 of the periodic structure 1002 shown in FIG. 10A comprising a plurality of reference channels 1010 and a plurality of sample channels 1020, wherein cross sections (depicted in FIG. 10E) are shown to be taken along an x direction. In this case, the periodic structure includes sample channel 1051 and reference channel 1052. Reference channel 1052 has an optical path length variation along a direction of material flow 1008. Each reference channel and each sample channel is about equal in a width w (shown at 1030). For reference purposes, a set of 2D primary axes is provided at 1094 with the direction of material flow 1008 (flow direction) proceeding along the y-axis in a direction y and a width w of the reference region or channel of the slide indicated along the x-axis in a direction x. Additionally, a first cross-section is taken of the area 1050 of the periodic structure along an axis in the x direction designated by endpoints G1 and G2 at a first location in y closer or proximal to the inlet and a second cross-section is taken of the area 1050 of the periodic structure along an axis in the y direction designated by endpoints H1 and H2 at a second location in y closer or proximal to the outlet. These cross-sectional views of the area 1050 at the first and second locations are depicted in and described with respect to FIG. 10E.

Figure 10E:
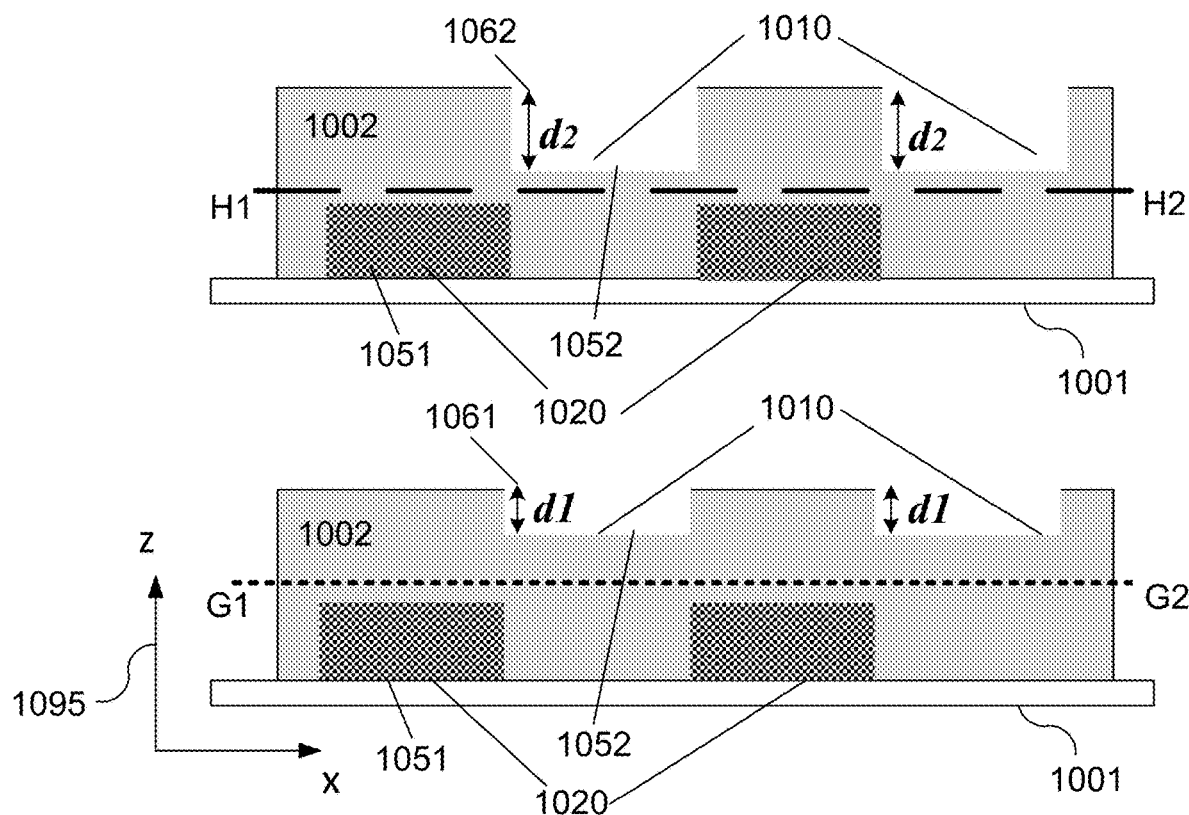
FIG. 10E depicts a cross-section or profile view taken along an x direction at a first location and a second location of the area of the periodic structure shown in FIG. 10D.

FIG. 10E is a depiction of a cross-section or profile view of the area 1050 of the periodic structure 1002 disposed on substrate 1001 at a first location designated by endpoints G1 and G2 and at a second location designated by endpoints H1 and H2. For reference purposes, a set of 2D primary axes is provided at 1095 with the thickness or depth of the reference channel indicated along the z-axis in a direction z. The periodic structure 1002 comprises a plurality of reference channels 1010 and a plurality of sample channels 1020.

FIG. 10E shows the reference channels 1010 formed by grooves or recessed regions carved into, set within, or disposed on a top surface of the periodic structure 1002, and sample channels 1020 disposed on a bottom surface of the periodic structure 1002 adjacent to substrate 1001.

Although the thickness change is greatly exaggerated for illustrative purposes, the reference regions or channels 1010 are configured to increase gradually in thickness or depth along the y-axis in a direction y from an input (e.g., input 1011 of FIG. 10A) to an output (e.g., output 1012 of FIG. 10A). In FIG. 10E, this gradual increase in thickness or depth of the reference region or channel (e.g., air channel) along the y-axis in a direction y is shown by a depth difference of the reference channels at the two cross-section locations. In particular, the reference channels are at a depth $d_1$ at 1061, taken at the cross section of the first location designated by endpoints G1 and G2 and are at a different depth $d_2$ at 1062, taken at the cross section of the second location designated by endpoints H1 and H2. In this case, since the depth of the reference channels is increasing, we see that $d_2$ is greater than $d_1$. In contrast, in this example, the height of the sample channels 1020 remains constant. In some embodiments (not shown), where the depth of the reference channel is decreasing along a direction of material flow, $d_2$ would be less than $d_1$. As described above, the gradual increase in depth of the reference channel results in an optical path length variation for light applied through the slide as the light passes through different thicknesses of the reference channel along the y-axis in a direction y.

Using the systems described above to take a series of measurements or snapshots (e.g., interferograms) of an object as it migrates through a sample region or channel of the slide corresponding to an increasing thickness of a reference region or channel along the y-axis in a direction y, each successive measurement or snapshot being taken when the object is in a position corresponding to an increased thickness, height, or depth of the reference channel, one can effectively add a phase change in each measurement or snapshot that is taken at a successive point in time. This phase change is visible by tilt fringes that will exist running parallel to the x-axis due to the OPL variation along the y-axis of the reference regions as described in more detail with respect to the following figure.

Figure 11A:
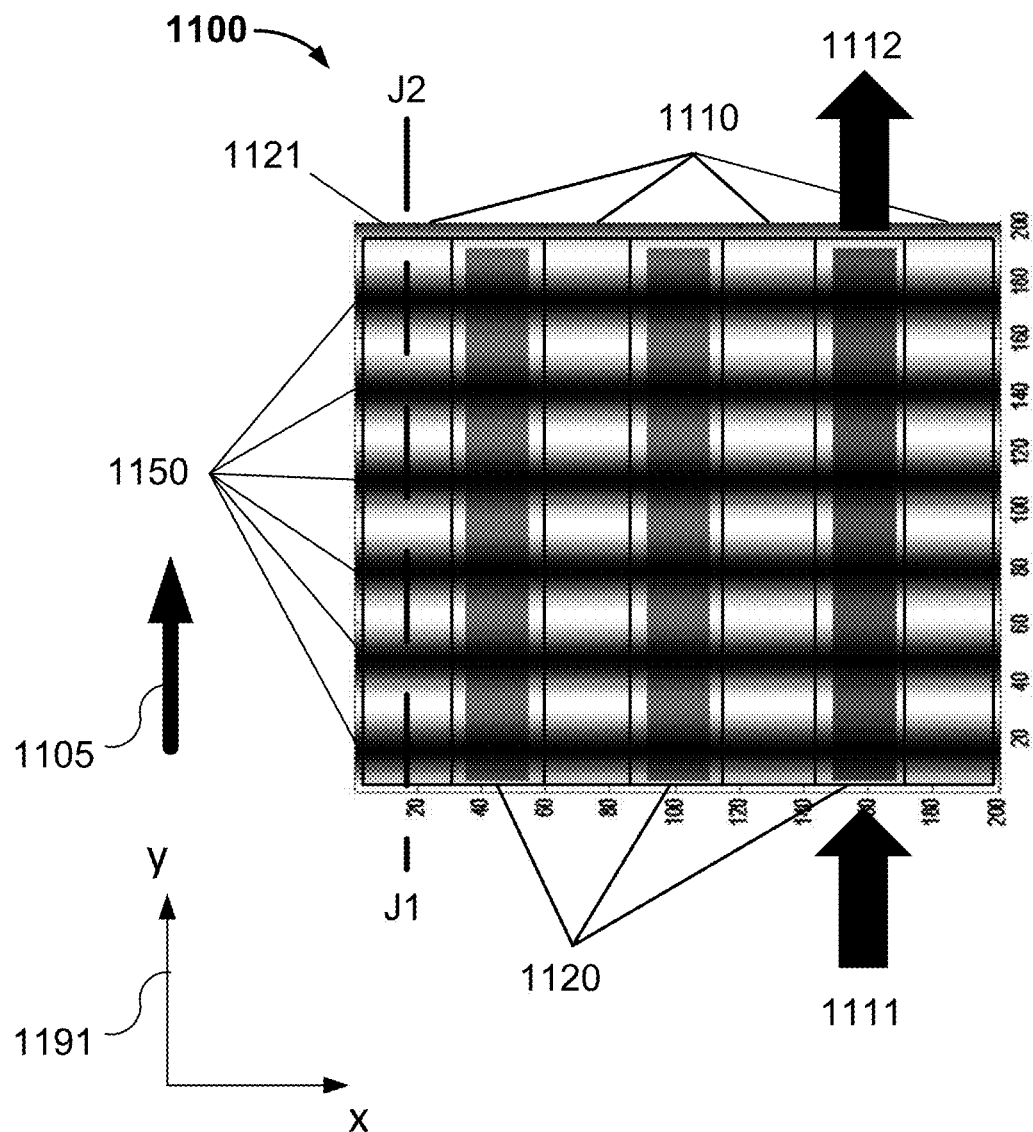
FIG. 11A depicts a top view of an exemplary embodiment of an area of a shearing microscope slide that includes a periodic structure having an optical path length variation along a direction of material flow.

FIG. 11A is a depiction of a top view of an exemplary embodiment of an area 1100 of a shearing microscope slide that includes a periodic structure having an optical path length variation along a direction of material flow. In some embodiments, for instance as described in previous examples depicted in FIGS. 9A-9E and 10A-10E, the optical path length variation is due to a thickness change built into the reference regions of the slide. In these embodiments, each of the reference channels is configured to have an optical path length variation along a direction of material flow by changing a thickness of each of the reference channels along a direction of material flow. However, there are other ways to provide an optical path variation along a direction of material flow. In particular, each of the reference channels can be configured to have an optical path length variation along a direction of material flow by varying a proportion of high and low refractive index materials into each of the reference channels. In other embodiments, each of the reference channels is configured to have an optical path length variation along a direction of material flow, wherein a set of selected reference channels are configured to have a thickness offset relative to a set of unselected reference channels to reduce a number of measurements needed for temporal phase shifting, and wherein every other reference channel in the plurality of reference channels is selected.

In this case, the periodic structure shown in FIG. 11A includes a plurality of alternating reference regions or channels 1110 and sample regions or channels 1120. The sample channels 1120 are configured to accommodate a flow of the material from an input 1111 to an output 1112 and the reference channels 1110 are configured to provide references that remove sample overlap in a sheared microscopic measurement. In some embodiments, the input at 1111 includes an inlet (e.g., inlet 911 of FIG. 9A or inlet 1011 of FIG. 10A) and the output at 1112 includes an outlet (e.g., outlet 912 of FIG. 9A or outlet 1012 of FIG. 10A). In some cases, the reference channels 1110 are configured to provide planar references that remove sample overlap in the sheared microscopic measurement.

Additionally, FIG. 11A also shows fringes 1150 running parallel to the x-axis due to the OPL variation along the y direction of the reference regions of the slide. Here, the fringes 1050 are due to $OPD_{reference\_region}(y)=m*y$, where m is a slope of a line expressed in units of nanometers of OPD variation/micrometers of spatial position change. In particular, as the sample material containing objects such as cells flows in y, the cells are measured by different fringe phases, which is equivalent to making a phase shift measurement but without requiring any moving mirrors as may be the case for example in other shearing configurations or setups. In this example, for reference purposes, a set of 3D primary axes is provided at 1191 with the direction of material flow (flow direction) proceeding along the y-axis as indicated at 1105, and also as indicated by arrows at the input and at the output.

As shown in FIG. 11A, a cross-section is taken of a reference channel 1121 along an axis in the y direction designated by endpoints J1 and J2. A cross-section or profile view of reference channel 1121 is depicted in and described with respect to FIG. 11B.

Figure 11B:
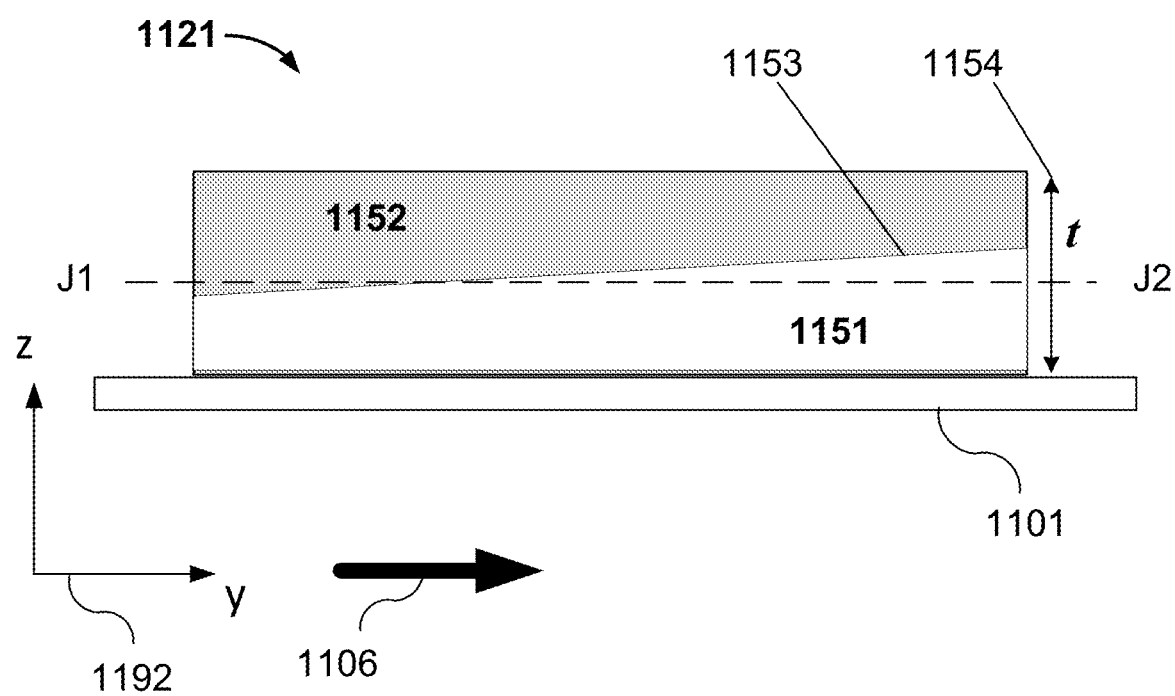
FIG. 11B depicts a cross-section or profile view of an exemplary embodiment of a reference region or channel of FIG. 11A, wherein the cross-section is taken along an axis in the y direction.

FIG. 11B is a depiction of a cross-section or profile view of an exemplary embodiment of the reference region or channel (1121) of FIG. 11A, wherein the cross-section is taken along an axis in the y direction designated by endpoints J1 and J2. In this embodiment, each of the reference channels (e.g., as shown at 1110 in FIG. 11A) is configured to have an optical path length variation along a direction of material flow by varying a proportion of high and low refractive index materials into each of the reference channels. For reference purposes, a set of 2D primary axes is provided at 1192 with the direction of material flow (flow direction) proceeding along the y-axis in a direction y as indicated at 1106 and the thickness or height of the slide indicated along the z-axis in a direction z.

In the example of FIG. 11B, reference channel 1121 is configured to have an optical path length variation along a direction of material flow along the y-axis in a direction y as indicated at 1106 by varying a proportion of high and low refractive index materials into reference channel 1121. Here, reference channel 1121 comprises a first material (e.g., material 1 at 1151) having a first index of refraction $n_1$ and a second material (e.g., material 2 at 1152) having a second index of refraction $n_2$, where $n_1$ is not equal to $n_2$.

As shown in FIG. 11B, material 1 (1151) and material 2 (1152) are pressed together in two opposing wedges built into reference channel 1121 to form a slope 1153 between the wedges while maintaining a constant total thickness t (1154) of the reference region or channel 1121 along a direction of material flow 1106. Note that in FIG. 11B, the slope 1153 is greatly exaggerated for illustrative purposes and the opposing wedges are configured to form a gradual slope between the high and low refractive index materials, in this case, between material 1 (1151) and material 2 (1152). The gradual slope created by varying the proportions of high and low refractive index materials built into the reference channel results in a gradual change in the effective index of refraction as the sample material flows through the slide thus providing a mechanism for temporal phase shifting. The goal in this case is to introduce a few waves of optical path difference across the field of view in the y direction (i.e., the direction of material flow), which is a 2-3 microns of OPD across the field of view.

Figure 12A:
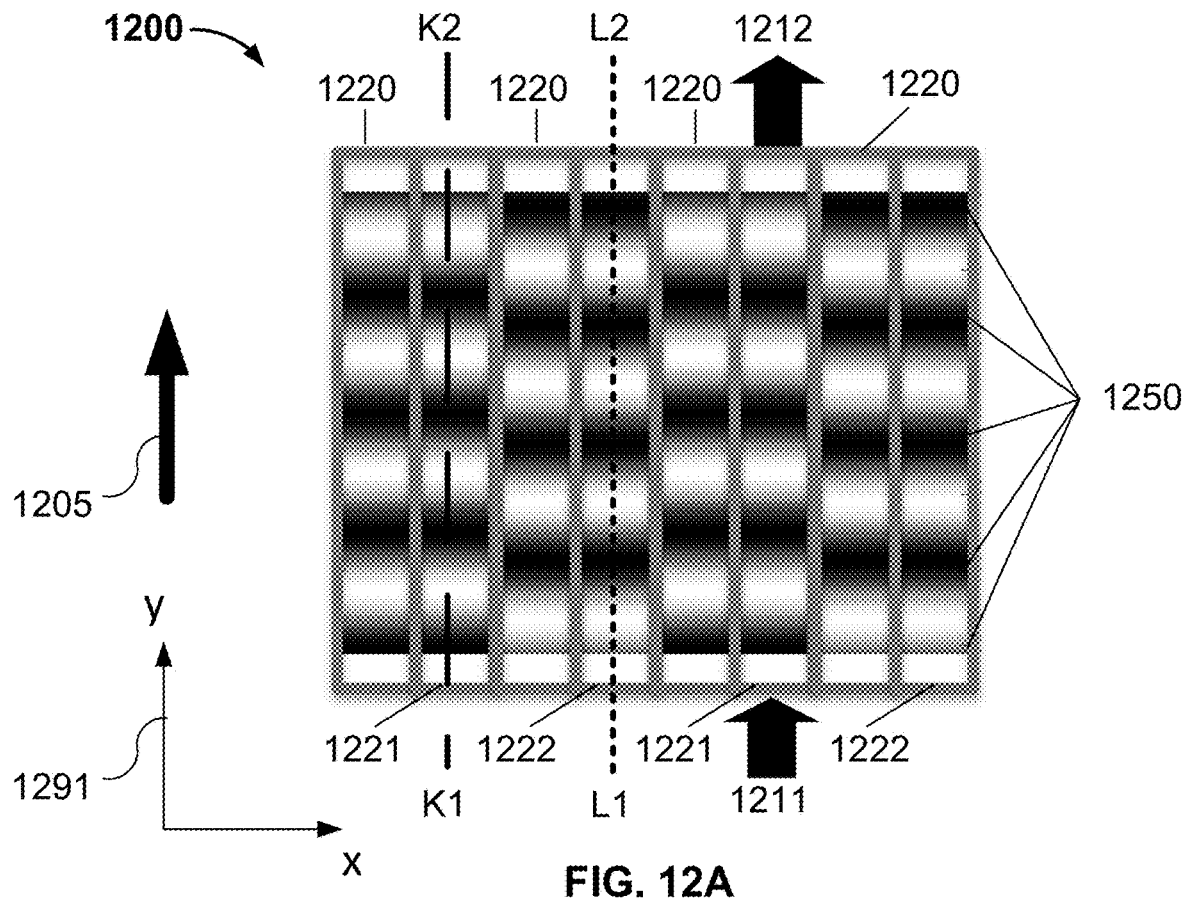
FIG. 12A depicts a top view of an exemplary embodiment of an area of a shearing microscope slide, wherein cross sections are taken along a y direction.

FIG. 12A is a depiction of a top view of an exemplary embodiment of an area 1200 of a shearing microscope slide wherein cross sections are taken along a y direction. The slide includes a periodic structure having an optical path length variation along a direction of material flow due to a thickness change built into the reference regions or channels of the slide. For reference purposes, a set of 3D primary axes is provided at 1291 with the direction of material flow (flow direction) proceeding along the y-axis as indicated at 1205.

In the example shown, the slide comprises a periodic structure having a plurality of alternating reference regions or channels and sample regions or channels as shown in the area 1200. The sample regions or channels 1220 are configured to accommodate a flow of the material from an input 1211 to an output 1212 and the reference regions or channels 1221 and 1222 are configured to provide planar references that remove sample overlap in a sheared microscopic measurement. In some embodiments, the input 1211 includes an inlet (not shown), which can be, for example inlet 911 of FIG. 9A or inlet 1011 of FIG. 10A, and the output 1212 includes an outlet (not shown), which can be, for example outlet 912 of FIG. 9A or outlet 1012 of FIG. 10A. In this case, a set of selected reference regions or channels (e.g., at 1221) are configured to have a thickness offset relative to a set of unselected reference regions or channels (e.g., at 1222) to reduce a number of measurements needed for temporal phase shifting, wherein every other reference region or channel in the plurality of reference regions or channels is selected (e.g., at 1221).

As shown in FIG. 12A, a cross-section is taken of a reference channel 1221 (designated by endpoints K1 and K2) and reference channel 1222 (designated by endpoints L1 and L2) along an axis in the y direction. The cross-section or profile views of reference channels 1221 and 1222 are depicted in and described with respect to FIG. 12B.

Figure 12B:
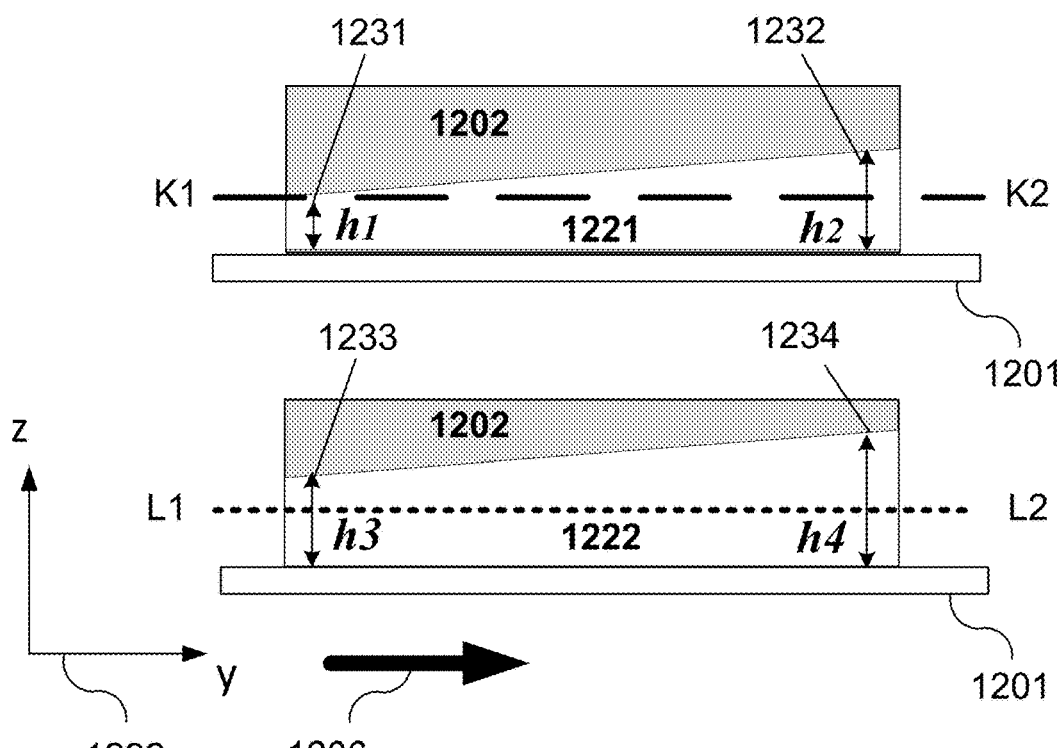
FIG. 12B depicts cross section or profile views of two reference channels shown in FIG. 12A, wherein the cross section is taken along an axis in the y direction.

FIG. 12B is a depiction of cross-section or profile views of two reference channels shown at 1221 and 1222 of FIG. 12A, wherein the cross-section is taken along an axis in the y direction designated by endpoints K1 and K2 and endpoints L1 and L2 respectively. For reference purposes, a set of 2D primary axes is provided at 1292 with the direction of material flow (flow direction) proceeding along the y-axis in a direction y as indicated at 1206 and the thickness or height of the slide indicated along the z-axis in a direction z.

In this case, each of the reference regions or channels 1221 and 1222 of FIG. 12A is configured to have an optical path length variation along a direction of material flow. Moreover, every other reference region or channel is configured to have a thickness offset relative to the remaining reference regions or channels to reduce a number of measurements or snapshots needed for temporal phase shifting. As shown in FIGS. 12A and 12B, every other reference region or channel (e.g., the odd reference regions at 1221) is configured with a thickness offset relative to the remaining regions or channels (e.g., the even regions at 1222), so that only two measurements in time are needed to get the four measurements needed to do phase shifting. To better illustrate the thickness offset between reference channels, additional cross-sectional views along an x-axis are taken and elements of the system are further described with respect to the following figures.

Figure 12C:
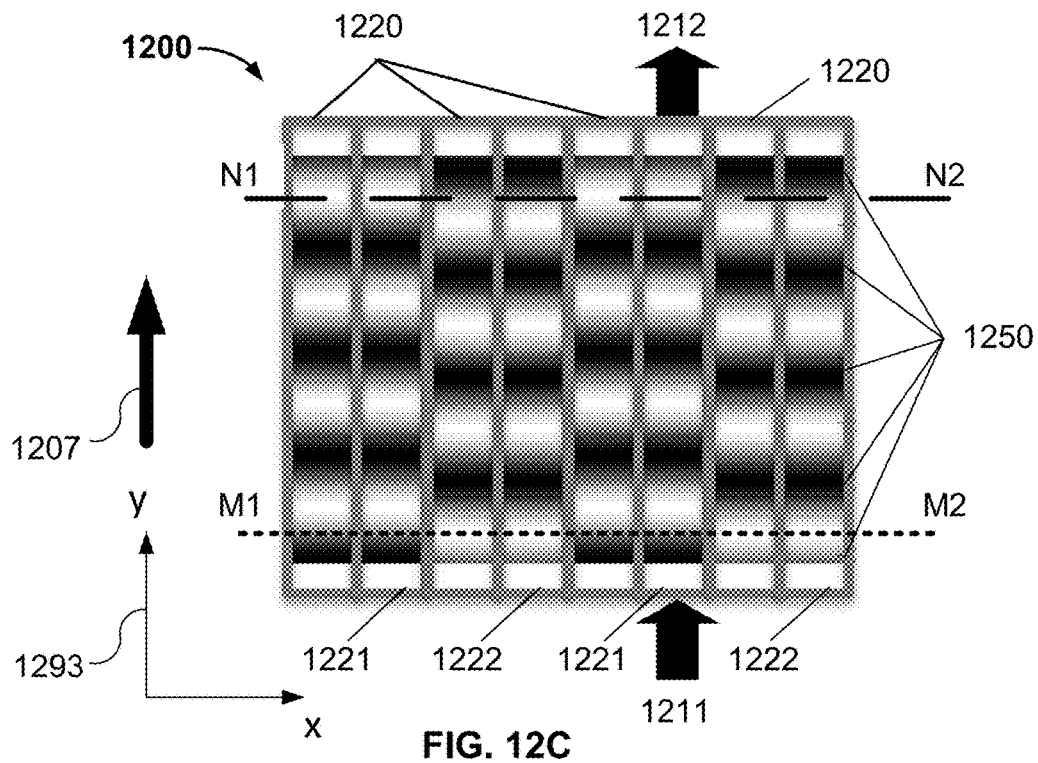
FIG. 12C depicts a top view of an exemplary embodiment of the area depicted in FIG. 12A, wherein cross sections are taken along an x direction.

FIG. 12C is a depiction of a top view of an exemplary embodiment of the area 1200 of a shearing microscope slide depicted in FIG. 12A wherein cross sections are taken along an x direction. The slide includes a periodic structure having an optical path length variation along a direction of material flow due to a thickness change built into the reference regions or channels of the slide. For reference purposes, a set of 3D primary axes is provided at 1293 with the direction of material flow (flow direction) proceeding along the y-axis as indicated at 1207.

As in the previous example of FIG. 12A, the slide in this case comprises a periodic structure having a plurality of alternating reference regions or channels and sample regions or channels as shown in the area 1200. The sample regions or channels 1220 are configured to accommodate a flow of the material from an input 1211 to an output 1212 and the reference regions or channels 1221 and 1222 are configured to provide planar references that remove sample overlap in a sheared microscopic measurement. In some embodiments, the input 1211 includes an inlet (not shown), which can be, for example inlet 911 of FIG. 9A or inlet 1011 of FIG. 10A, and the output 1212 includes an outlet (not shown), which can be, for example outlet 912 of FIG. 9A or outlet 1012 of FIG. 10A. In this case, a set of selected reference regions or channels (e.g., at 1221) are configured to have a thickness offset relative to a set of unselected reference regions or channels (e.g., at 1222) to reduce a number of measurements needed for temporal phase shifting, wherein every other reference region or channel in the plurality of reference regions or channels is selected (e.g., at 1221).

As shown in FIG. 12C, a first cross-section is taken of the area 1200 of the periodic structure along an axis in the x direction designated by endpoints M1 and M2 at a first location in y closer or proximal to input 1211. A second cross-section is taken of the area 1200 of the periodic structure along an axis in the y direction designated by endpoints N1 and N2 at a second location in y closer or proximal to output 1212. These cross-section or profile views of the area 1200 at the first and second locations are depicted in and described with respect to FIG. 12D.

Figure 12D:
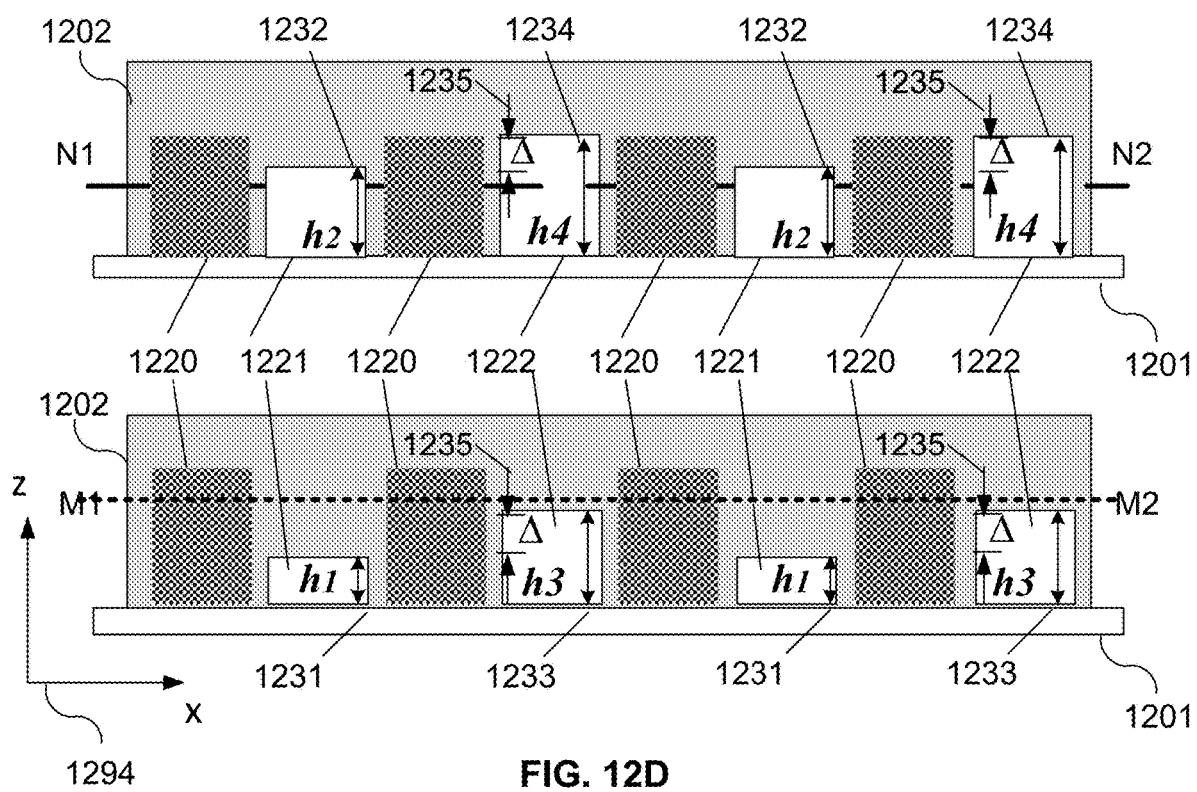
FIG. 12D is a depiction of a cross-section or profile view taken along an x direction of the area of FIG. 12C at a first location and a second location.

FIG. 12D is a depiction of a cross-section or profile view of the area 1200 of FIG. 12C at a first location designated by endpoints M1 and M2 and at a second location designated by endpoints N1 and N2. For reference purposes, a set of 2D primary axes is provided at 1294 with the thickness or height of the reference region or channel of the slide indicated along the z-axis in a direction z.

Although the thickness change is greatly exaggerated for illustrative purposes, the reference regions or channels 1221 and 1222 are configured to increase gradually in thickness along the y-axis in a direction y (shown at 1207 of FIG. 12C) from an input 1211 to an output 1212. In FIG. 12D, this gradual increase in thickness of the reference region or channel (e.g., air channel) along the y-axis in a direction y is shown by a height difference of each of the reference channels at the two cross-section locations.

In particular, each reference channel in a set of selected reference channels (1221) is configured to have a height $h_1$ at 1231, taken at the cross section of the first location designated by endpoints M1 and M2 and is configured to have a different height $h_2$ at 1232, taken at the cross section of the second location designated by endpoints N1 and N2. In this case, since the height of the set of selected reference channels is increasing along a direction y, we see that $h_2$ is greater than $h_1$. In other embodiments (not shown), where the height of the reference channel is decreasing along a direction of material flow, $h_2$ would be less than $h_1$. As described above, the gradual increase in height of the reference channel results in an optical path length variation for light applied through the slide as the light passes through different thicknesses of the reference channel along the y-axis in a direction y.

Each reference channel in a set of unselected reference channels (1222) is configured to have a height $h_3$ at 1233, taken at the cross section of the first location designated by endpoints M1 and M2 and is configured to have a different height $h_4$ at 1234, taken at the cross section of the second location designated by endpoints N1 and N2. In this case, since the height of the set of selected reference channels is increasing along a direction y, we see that ha is greater than $h_3$. In other embodiments (not shown), where the height of the reference channel is decreasing along a direction of material flow, ha would be less than $h_3$. As described above, the gradual increase in height of the reference channel results in an optical path length variation for light applied through the slide as the light passes through different thicknesses of the reference channel along the y-axis in a direction y.

Note that in this case, each reference channel in the set of selected reference channels (1221) is configured to have a thickness offset Δ (1235) relative to each reference channel in a set of unselected reference channels (1222) to reduce a number of measurements needed for temporal phase shifting, wherein every other reference channel in the plurality of reference channels is selected as shown at 1221.

Here, the thickness offset Δ (1235) between neighboring reference regions or channels (e.g., between a reference channel at 1221 and a reference channel at 1222) results in fringes 1250 being offset by some amount; in this case, by π/2 radians. For clarity and illustrative purposes, fringes 1250 are not shown over the whole region in the y direction of the slide 1200 in FIGS. 12A and 12C, although in reality, the fringes would extend across the entire field of view.

Note also that if the object (e.g., cell contained or suspended in a sample material) changes position as it flows through the channel, software can be written to correlate the same object in a first measurement or snapshot and a second measurement or snapshot, allowing the phase shifting measurement to be made. By making two measurements at a single camera frame, as in FIG. 12, the object correlation software task becomes easier, as there are fewer object positions as a function of time that need to be correlated to each other.

Figure 13:
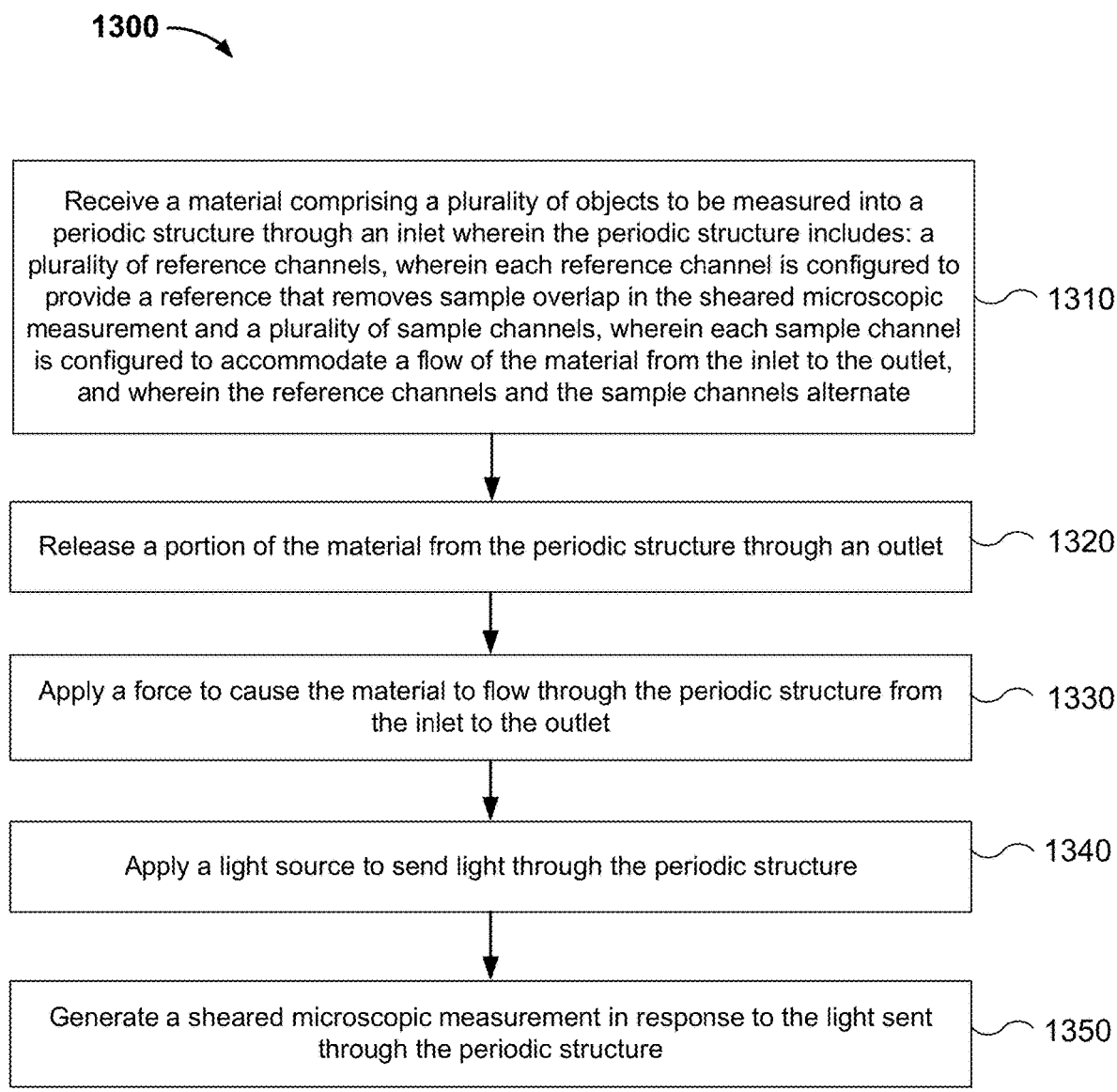
FIG. 13 shows a flowchart depicting an exemplary method for generating sheared microscopic measurements that provides for a flow of sample material and enables temporal phase shifting with improved spatial resolution.

FIG. 13 shows a flowchart depicting an exemplary method 1300 for generating sheared microscopic measurements that provides for a flow of sample material and enables temporal phase shifting with improved spatial resolution. Note that method 1300 can be performed using a system as described previously with respect to FIGS. 9A-9E, 10A-10E, 11A-11B, and 12A-12-D.

Method 1300 includes receiving a material comprising a plurality of objects to be measured into a periodic structure through an inlet at 1310. In the example shown, the periodic structure includes a plurality of reference channels, wherein each reference channel in the plurality of reference channels is configured to provide a reference that removes sample overlap in the sheared microscopic measurement and a plurality of sample channels, wherein each sample channel in the plurality of sample channels is configured to accommodate a flow of the material from the inlet to the outlet. Moreover, the plurality of reference channels and the plurality of sample channels alternate.

In some cases, the material is a sample and the objects comprise cells. In some cases, each reference channel and each sample channel is about equal in a width w to each other and to each of the other reference channels and each of the other sample channels and a shear distance in the lateral shearing interferometer is an odd integer multiple of the width w of each reference channel and each sample channel. In some embodiments, the reference channels are configured to provide planar references that remove sample overlap in the sheared microscopic measurement.

At 1320, a portion of the material is released from the periodic structure through an outlet and a force is applied at 1330 to cause the material to flow through the periodic structure from the inlet to the outlet. At 1340, a light source is applied to send light through the periodic structure and at 1350, a sheared microscopic measurement is generated in response to the light sent through the periodic structure. In some cases, generating the sheared microscopic measurement comprises generating a laterally sheared interferogram using a lateral shearing interferometer.

Figure 14:
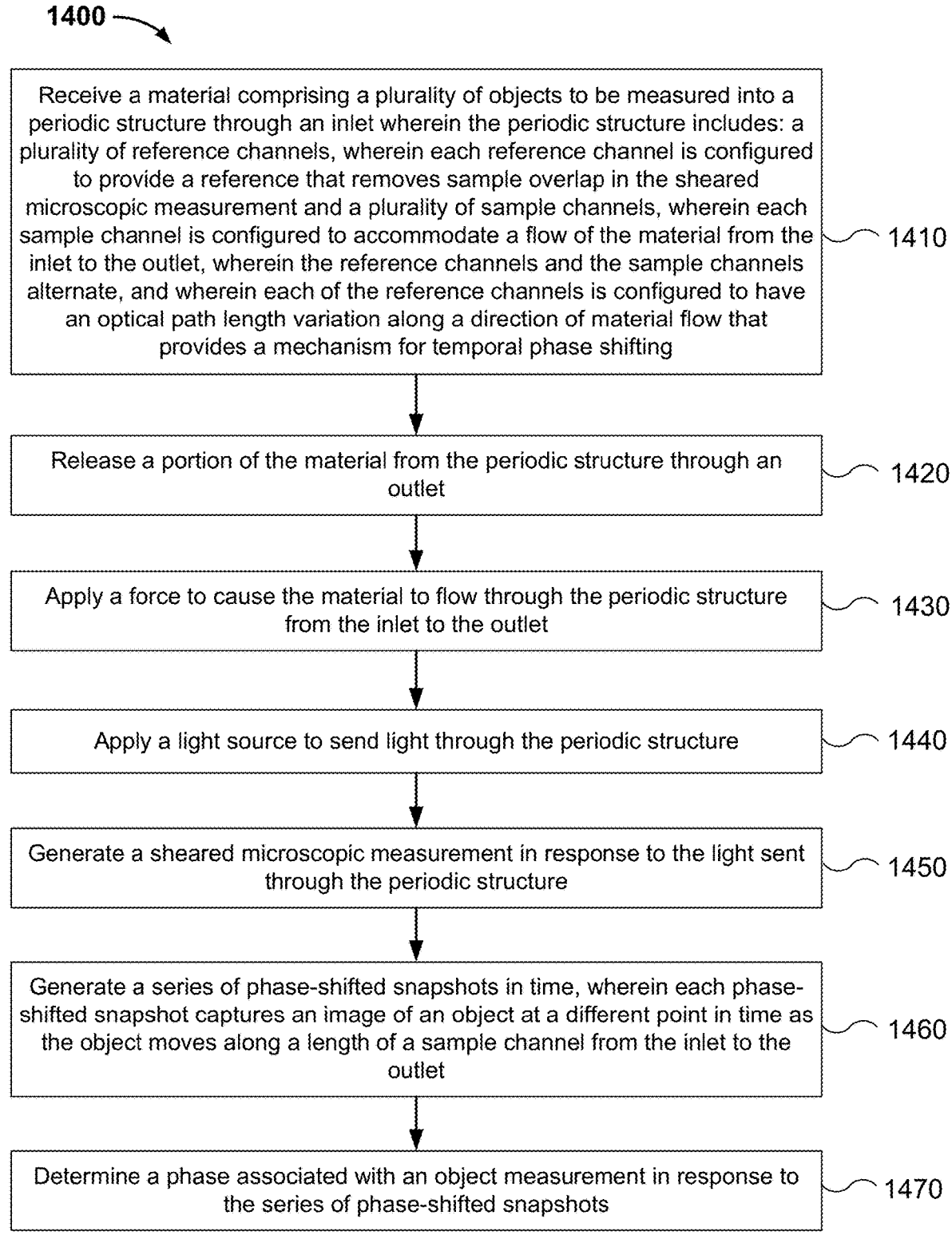
FIG. 14 shows a flowchart depicting an exemplary method for generating sheared microscopic measurements that provides for a flow of sample material and enables temporal phase shifting including by using reference channels configured to have an optical path length variation.

FIG. 14 shows a flowchart depicting an exemplary method 1400 for generating sheared microscopic measurements that provides for a flow of sample material and enables temporal phase shifting including by using reference channels configured to have an optical path length variation. Note that method 1400 can be performed using a system as described with respect to FIGS. 9A-9E, 10A-10E, 11A-11B, and 12A-12-D above.

Method 1400 includes receiving a material comprising a plurality of objects to be measured into a periodic structure through an inlet at 1410. In the example shown, the periodic structure includes a plurality of reference channels, wherein each reference channel in the plurality of reference channels is configured to provide a reference that removes sample overlap in the sheared microscopic measurement and a plurality of sample channels, wherein each sample channel in the plurality of sample channels is configured to accommodate a flow of the material from the inlet to the outlet. Moreover, the plurality of reference channels and the plurality of sample channels alternate.

In some cases, the material is a sample and the objects comprise cells. In some cases, each reference channel and each sample channel is about equal in a width w to each other and to each of the other reference channels and each of the other sample channels and a shear distance in the lateral shearing interferometer is an odd integer multiple of the width w of each reference channel and each sample channel. In some embodiments, the reference channels are configured to provide planar references that remove sample overlap in the sheared microscopic measurement. In this case, the reference channels are further configured to have an optical path length variation along a direction of material flow that provides a mechanism for temporal phase shifting.

As shown in FIG. 14, method 1400 includes releasing a portion of the material from the periodic structure through an outlet at 1420 and applying a force to cause the material to flow through the periodic structure from the inlet to the outlet at 1430. A light source is applied to send light through the periodic structure at 1440 and a sheared microscopic measurement is generated in response to the light sent through the periodic structure at 1450. In some cases, generating the sheared microscopic measurement comprises generating a laterally sheared interferogram using a lateral shearing interferometer.

Method 1400 also includes generating a series of phase-shifted snapshots in time at 1460, wherein each phase-shifted snapshot captures an image of an object at a different point in time as the object moves along a length of a sample channel from the inlet to the outlet. At 1470, a phase associated with an object measurement is determined in response to the series of phase-shifted snapshots.

In this case, by configuring the reference channels to have an optical path length variation along a direction of material flow, an ability is provided to introduce a phase shift to the object as it moves along sample channel. As the sample flows, it is interfered with a reference signal with varying phase, allowing phase shifting which can be captured by taking a succession of snapshots over time. The succession of snapshots (e.g., set of interferograms) can then be analyzed to determine the phase, $\Phi(x,y)$, at each pixel in an image. In particular, irradiance $I(x,y)$ is governed by the following interference equation:

$$I(x,y)=I_{dc}(x,y)+I_{ac}(x,y)\cos\ [\Phi(x,y)+\Phi(t)]$$

In the above equation, $I_{dc}$, $I_{ac}$, and $\Phi(x,y)$ are unknown, and thus the minimum number of measurements or snapshots needed to determine $\Phi(x,y)$ is three. Improvements to the solution can be achieved with more measurements to reduce the error due to incorrect phase shifts.

The most common phase shift between images is $\pi/2$ radians (90°):

$$I_1(x,y)=I_{dc}+I_{ac}\cos\ [\Phi(x,y)]\Phi(t)=0(0°)$$

$$I_2(x,y)=I_{dc}-I_{ac}\sin\ [\Phi(x,y)]\Phi(t)=\pi/2(90°)$$

$$I_3(x,y)=I_{dc}-I_{ac}\cos\ [\Phi(x,y)]\Phi(t)=\pi(180°)$$

$$I_4(x,y)=I_{dc}+I_{ac}\sin\ [\Phi(x,y)]\Phi(t)=3\pi/2(270°)$$

Common algorithms for calculating the phase include:

$$\Phi=\tan^{-1}[(I_3-I_2)/(I_1-I_2)] \quad \text{(three step)}$$

$$\Phi=\tan^{-1}[(I_4-I_2)/(I_1-I_3)] \quad \text{(four step)}$$

$$\Phi=\tan^{-1}[2(I_2-I_4)/(2I_3-I_5-I_1)] \quad \text{(five step)}$$

As noted above, a minimum of three snapshots is needed to determine the phase, in which case the three-step algorithm above can be used. To help reduce error due to incorrect phase shifts, the four-step algorithm above can be used if a fourth measurement or snapshot is available. Finally, the solution can be improved further when a fifth measurement or snapshot is taken, where $\Phi(t)=2\pi$ (360°), using the five-step algorithm above known as the Schwider-Hariharan algorithm. More specifically, in cases where the phase shift is not exactly $\pi/2$ between images, errors will be apparent in the phase at twice the frequency of the interference fringes. A fifth image can be used to significantly reduce this error in the calculated phase. Finally, an optical path difference (OPD) can be determined from the calculated phase using the following:

$$OPD(x,y) = \frac{\lambda}{2\pi}\phi(x,y)$$

Additional details regarding phase shifting algorithms are provided in a *Field Guide to Interferometric Optical Testing, SPIE Field Guides, Volume FG*10, by Eric P. Goodwin and James C. Wyant (2006), the entirety of which is incorporated herein by reference. Moreover, as mentioned above, the phase change does not have to be an exact value, as LSPSI (Least Squares Phase Shifting Interferometry) or other techniques can be used to calculate the phase of the measurement regions.

Figure 15:
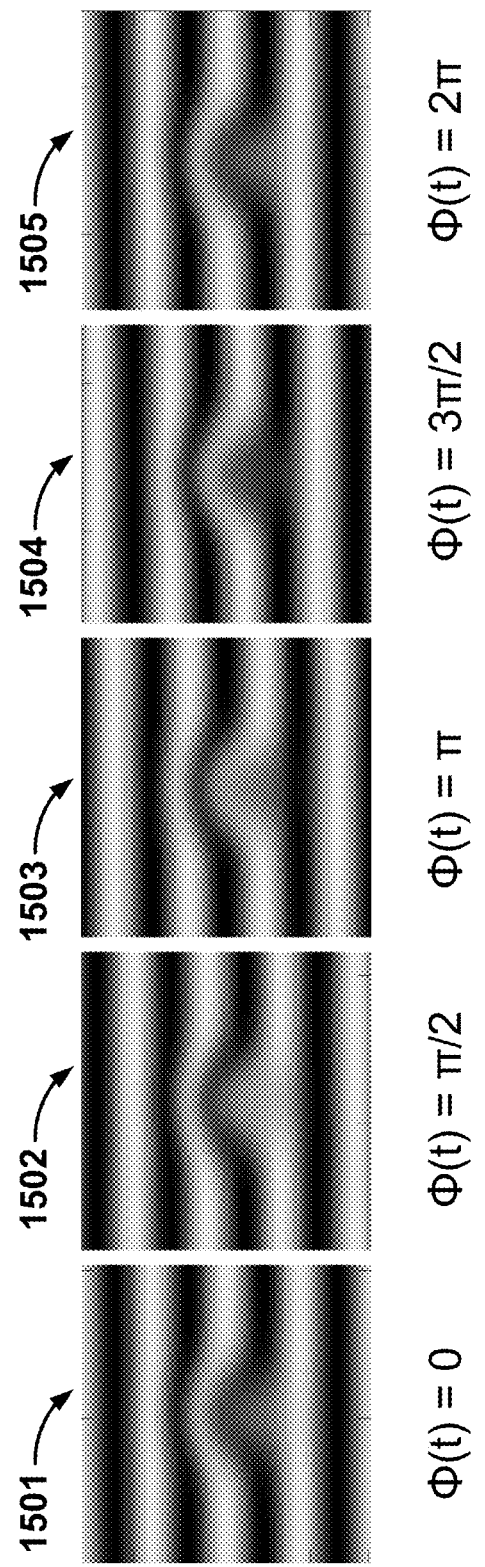
FIG. 15 shows a depiction of a series of phase-shifted snapshots that capture an image of an object at different points in time as the object moves along a length of a sample channel in a shearing microscope slide from an inlet to an outlet.

FIG. 15 shows a depiction of a series of phase-shifted snapshots that capture an image of an object at different points in time as the object moves along a length of a sample channel in a shearing microscope slide from an inlet to an outlet. In the example shown, a first snapshot 1501 indicates a measurement of an object corresponding to $\Phi(t)=0$ (0°), a second snapshot 1502 indicates a measurement of the object corresponding to $\Phi(t)=\pi/2$ (90°), a third snapshot 1503 indicates a measurement of the object corresponding to $\Phi(t)=(180°)$, and a fourth snapshot 1504 indicates a measurement of the object corresponding to $\Phi(t)=3\pi/2$ (270°). Additionally, in this case, a fifth snapshot 1505 is also shown that indicates a measurement of the object corresponding to $\Phi(t)=2\pi(360°)$. In response to the series of phase-shifted snapshots as shown in FIG. 15, the phase, $\Phi(x,y)$, at each pixel in an interferogram of the object can be calculated using a phase shifting algorithm as described above. An optical path difference (OPD) can then be determined from the calculated phase.

FIG. 16 shows a flowchart depicting an exemplary method 1600 for generating sheared microscopic measurements that provides for a flow of sample material and enables temporal phase shifting including by using reference channels configured to have an optical path length variation. Note that method 1600 can be performed using a system as described with respect to FIGS. 9A-9E, 10A-10E, 11A-11B, and 12A-12D above.

Method 1600 includes receiving a material comprising a plurality of objects to be measured into a periodic structure through an inlet at 1610. In the example shown, the periodic structure includes a plurality of reference channels, wherein each reference channel in the plurality of reference channels is configured to provide a reference that removes sample overlap in the sheared microscopic measurement and a plurality of sample channels, wherein each sample channel in the plurality of sample channels is configured to accommodate a flow of the material from the inlet to the outlet. Moreover, the plurality of reference channels and the plurality of sample channels alternate.

In some cases, the material is a sample and the objects comprise cells. In some cases, each reference channel and each sample channel is about equal in a width w to each other and to each of the other reference channels and each of the other sample channels and a shear distance in the lateral shearing interferometer is an odd integer multiple of the width w of each reference channel and each sample channel. In some embodiments, the reference channels are configured to provide planar references that remove sample overlap in the sheared microscopic measurement. In this case, the reference channels are further configured to have an optical path length variation along a direction of material flow that provides a mechanism for temporal phase shifting.

As shown in FIG. 16, method 1600 includes releasing a portion of the material from the periodic structure through an outlet at 1620 and applying a force to cause the material to flow through the periodic structure from the inlet to the outlet at 1630. A light source is applied to send light through the periodic structure at 1640 and a sheared microscopic measurement is generated in response to the light sent through the periodic structure at 1650. In some cases, generating the sheared microscopic measurement comprises generating a laterally sheared interferogram using a lateral shearing interferometer.

Method 1600 also includes generating a series of phase-shifted snapshots in time at 1660, wherein each phase-shifted snapshot captures an image of an object in a different location in a sample channel as the object moves along a length of the sample channel from the inlet to the outlet. At 1665, a phase change is determined in response to each phase-shifted snapshot. In some cases, a Least Squares Phase Shifting Interferometry technique is applied to determine the phase change in response to each phase-shifted snapshot. At 1670, a phase associated with an object measurement is determined in response to the phase change and the series of phase-shifted snapshots.

Figure 17A:
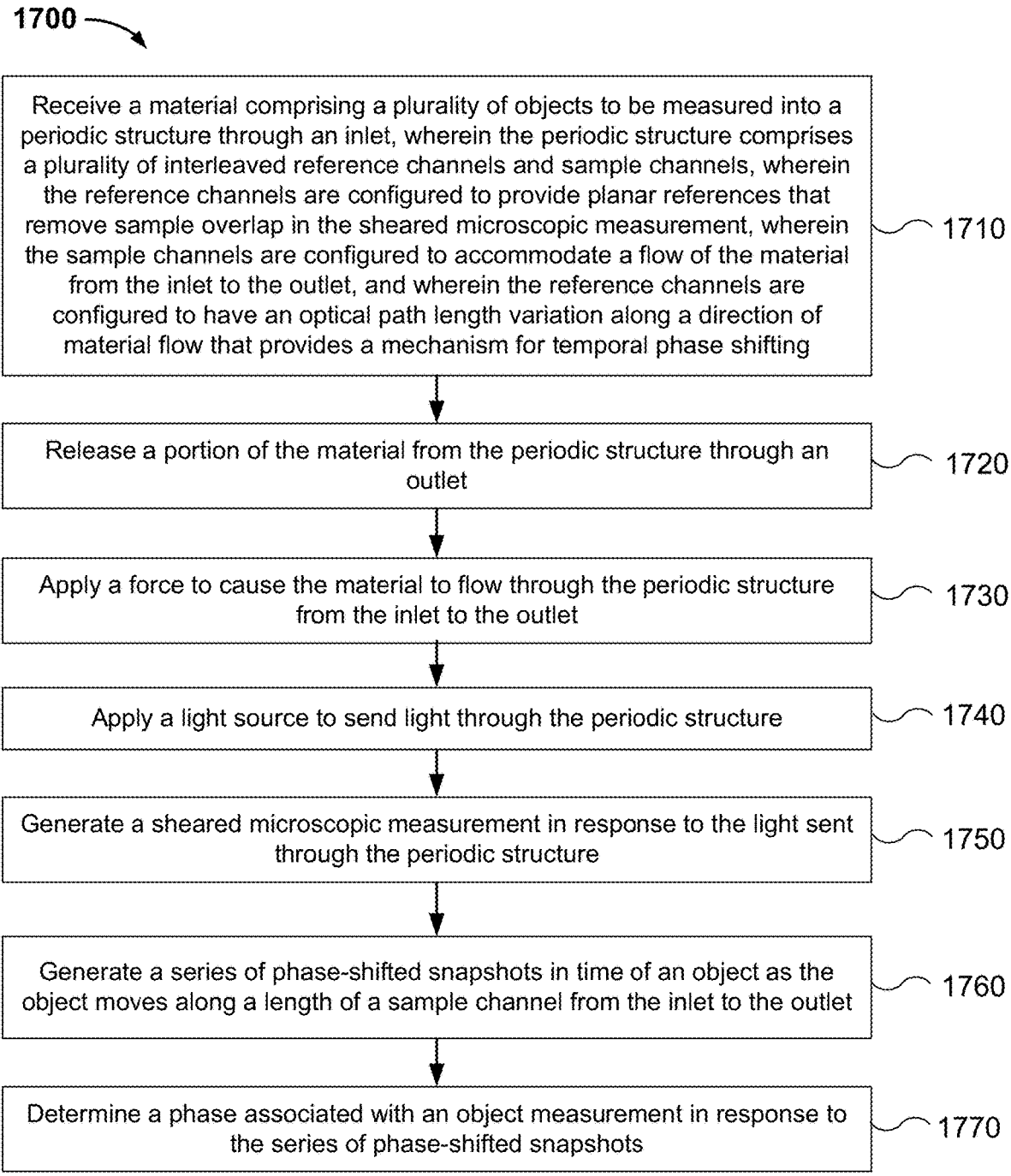
FIG. 17A shows a flowchart depicting an exemplary method for generating sheared microscopic measurements including by obtaining a series of snapshots of an object corresponding to various phase shifts.

FIG. 17A shows a flowchart depicting an exemplary method 1700 for generating sheared microscopic measurements that provides for a flow of sample material and enables temporal phase shifting including by obtaining a series of snapshots of an object corresponding to various phase shifts. Note that method 1700 can be performed using a system as described with respect to FIGS. 9A-9E, 10A-10E, 11A-11B, and 12A-12-D above.

Method 1700 includes receiving a material comprising a plurality of objects to be measured into a periodic structure through an inlet at 1710. In the example shown, the periodic structure includes a plurality of reference channels, wherein each reference channel in the plurality of reference channels is configured to provide a reference that removes sample overlap in the sheared microscopic measurement and a plurality of sample channels, wherein each sample channel in the plurality of sample channels is configured to accommodate a flow of the material from the inlet to the outlet. Moreover, the plurality of reference channels and the plurality of sample channels alternate.

In some cases, the material is a sample and the objects comprise cells. In some cases, each reference channel and each sample channel is about equal in a width w to each other and to each of the other reference channels and each of the other sample channels and a shear distance in the lateral shearing interferometer is an odd integer multiple of the width w of each reference channel and each sample channel. In some embodiments, the reference channels are configured to provide planar references that remove sample overlap in the sheared microscopic measurement. In this case, the reference channels are further configured to have an optical path length variation along a direction of material flow that provides a mechanism for temporal phase shifting.

As shown in FIG. 17A, method 1700 includes releasing a portion of the material from the periodic structure through an outlet at 1720 and applying a force to cause the material to flow through the periodic structure from the inlet to the outlet at 1730. A light source is applied to send light through the periodic structure at 1740 and a sheared microscopic measurement is generated in response to the light sent through the periodic structure at 1750. In some cases, generating the sheared microscopic measurement comprises generating a laterally sheared interferogram using a lateral shearing interferometer.

Method 1700 also includes generating a series of phase-shifted snapshots in time of an object as the object moves along a length of a sample channel from the inlet to the outlet at 1760. At 1770, a phase associated with an object measurement is determined in response to the series of phase-shifted snapshots.

Figure 17B:
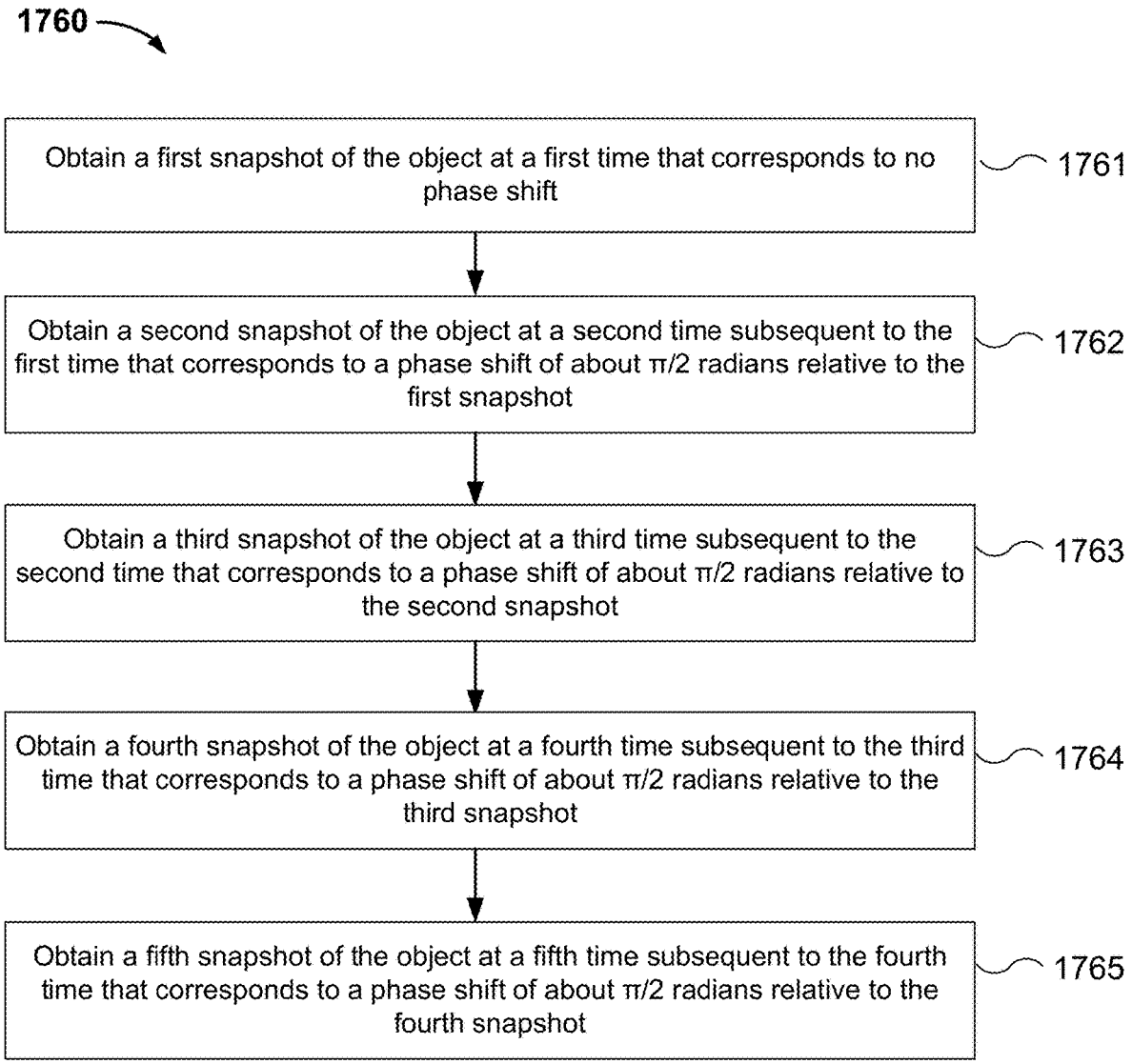
FIG. 17B shows a flowchart depicting steps for generating a series of phase-shifted snapshots in time.

FIG. 17B shows a flowchart depicting additional steps in the exemplary method 1760 for generating a series of phase-shifted snapshots in time. As shown in FIG. 17B, method 1760 includes obtaining a first snapshot of the object at a first time that corresponds to no phase shift at 1761, obtaining a second snapshot of the object at a second time subsequent to the first time that corresponds to a phase shift of about $\pi/2$ radians relative to the first snapshot at 1762, obtaining a third snapshot of the object at a third time subsequent to the second time that corresponds to a phase shift of about $\pi/2$ radians relative to the second snapshot at 1763, obtaining a fourth snapshot of the object at a fourth time subsequent to the third time that corresponds to a phase shift of about $\pi/2$ radians relative to the third snapshot at 1764, and obtaining a fifth snapshot of the object at a fifth time subsequent to the fourth time that corresponds to a phase shift of about $\pi/2$ radians relative to the fourth snapshot at 1765. Method 1760 can be performed to generate a series of phase-shifted snapshots that capture an image of an object at different points in time as the object moves along a length of a sample channel from the inlet to the outlet, such as the snapshots shown in FIG. 15.

Note that the steps depicted in FIGS. 13, 14, 16 and 17A do not need to be performed in a given order and may be performed out of order or simultaneously. The disclosed technique includes for example, performing measurements on objects contained in a sample material as the sample material is continuously flowing through the periodic structure and as a light source is being applied to send light through the period structure to generate the measurements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A shearing microscope slide comprising:
   a substrate;
   a periodic structure disposed on the substrate including:
      a plurality of reference regions and
      a plurality of sample regions;
   wherein the plurality of reference regions and the plurality of sample regions alternate and each of the reference regions in the plurality of reference regions is configured to provide a reference that removes sample overlap in a sheared microscopic measurement.

2. The slide of claim 1, wherein the reference regions and sample regions are parallel strips that extend along a length of the periodic structure and wherein each parallel strip is about equal in width as each of the other parallel strips, and wherein the reference regions are configured to provide planar references that remove sample overlap in the sheared microscopic measurement.

3. The slide of claim 1, wherein the sheared microscopic measurement comprises a laterally sheared interferogram generated by a lateral shearing interferometer, wherein the reference regions and sample regions are parallel strips that extend along a length of the periodic structure and wherein each parallel strip is about equal in width as each of the other parallel strips, and wherein a shear distance in the lateral shearing interferometer is an odd integer multiple of the width of each strip.

4. A system for generating sheared microscopic measurements, the system comprising:
   a substrate;
   an inlet disposed on the substrate, wherein the inlet is configured to receive a material comprising a plurality of objects to be measured;

an outlet disposed on the substrate, wherein the outlet is configured to release a portion of the material; and
a periodic structure disposed on the substrate including:
a plurality of reference channels, wherein each reference channel in the plurality of reference channels is configured to provide a reference that removes sample overlap in a sheared microscopic measurement and
a plurality of sample channels, wherein each sample channel in the plurality of sample channels is configured to accommodate a flow of the material from the inlet to the outlet;
wherein the plurality of reference channels and the plurality of sample channels alternate.

5. The system of claim 4, wherein:
the objects comprise cells;
the sheared microscopic measurement comprises a laterally sheared interferogram generated by a lateral shearing interferometer;
the plurality of reference channels and the plurality of sample channels extend along a length of the structure;
each reference channel and each sample channel is about equal in a width w to each of the other reference channels and each of the other sample channels;
a shear distance in the lateral shearing interferometer is an odd integer multiple of the width w of each reference channel and each sample channel; and
the reference channels are configured to provide planar references that remove sample overlap in the sheared microscopic measurement.

6. The system of claim 4, wherein each of the reference channels is configured to have an optical path length variation along a direction of material flow.

7. The system of claim 4, wherein each of the reference channels is configured to have an optical path length variation along a direction of material flow by changing a thickness of each of the reference channels along a direction of material flow.

8. The system of claim 4, wherein each of the reference channels is configured to have an optical path length variation along a direction of material flow by varying a proportion of high and low refractive index materials into each of the reference channels.

9. The system of claim 4, wherein each of the reference channels is configured to have an optical path length variation along a direction of material flow and wherein a set of selected reference channels are configured to have a thickness offset relative to a set of unselected reference channels to reduce a number of measurements needed for temporal phase shifting, wherein every other reference channel in the plurality of reference channels is selected.

10. A method comprising:
applying a light source to send light through a periodic structure disposed on a substrate; and
generating a sheared microscopic measurement in response to the light sent through the periodic structure, wherein:
the periodic structure includes a plurality of reference regions and a plurality of sample regions;
the plurality of reference regions and the plurality of sample regions alternate; and
each of the reference regions in the plurality of reference regions is configured to provide a reference that removes sample overlap in the sheared microscopic measurement.

11. The method of claim 10, wherein generating a sheared microscopic measurement comprises generating a laterally sheared interferogram using a lateral shearing interferometer.

12. The method of claim 10, wherein the reference regions and sample regions are parallel strips that extend along a length of the substrate and wherein each parallel strip is about equal in width as each of the other parallel strips, and wherein the reference regions are configured to provide planar references that remove sample overlap in a sheared microscopic measurement.

13. The method of claim 10, wherein generating a sheared microscopic measurement comprises generating a laterally sheared interferogram using a lateral shearing interferometer, wherein the reference regions and sample regions are parallel strips that extend along a length of the substrate and wherein each parallel strip is about equal in width as each of the other parallel strips, and wherein a shear distance in the lateral shearing interferometer is an odd integer multiple of the width of each strip.

14. A method for generating sheared microscopic measurements, the method comprising:
receiving a material comprising a plurality of objects to be measured into a periodic structure through an inlet;
releasing a portion of the material from the periodic structure through an outlet;
applying a force to cause the material to flow through the periodic structure from the inlet to the outlet;
applying a light source to send light through the periodic structure; and
generating a sheared microscopic measurement in response to the light sent through the periodic structure, wherein the periodic structure includes:
a plurality of reference channels, wherein each reference channel in the plurality of reference channels is configured to provide a reference that removes sample overlap in the sheared microscopic measurement and
a plurality of sample channels, wherein each sample channel in the plurality of sample channels is configured to accommodate a flow of the material from the inlet to the outlet, wherein the plurality of reference channels and the plurality of sample channels alternate.

15. The method of claim 14, wherein:
the objects comprise cells;
generating the sheared microscopic measurement comprises generating a laterally sheared interferogram using a lateral shearing interferometer;
applying a force to cause the material to flow through the periodic structure from the inlet to the outlet comprises applying a force to cause the material to flow through the sample channels;
the plurality of reference channels and the plurality of sample channels extend along a length of the structure;
each reference channel and each sample channel is about equal in a width w to each other and to each of the other reference channels and each of the other sample channels;
a shear distance in the lateral shearing interferometer is an odd integer multiple of the width w of each reference channel and each sample channel; and
the reference channels are configured to provide planar references that remove sample overlap in the sheared microscopic measurement.

16. The method of claim 14, wherein each of the reference channels is configured to have an optical path length variation along a direction of material flow.

17. The method of claim 14, wherein each of the reference channels is configured to have an optical path length variation along a direction of material flow that provides a mechanism for temporal phase shifting, the method further comprising:
generating a series of phase-shifted snapshots in time, wherein each phase-shifted snapshot captures an image of an object at a different point in time as the object moves along a length of a sample channel from the inlet to the outlet; and
determining a phase associated with an object measurement in response to the series of phase-shifted snapshots.

18. The method of claim 14, wherein each of the reference channels is configured to have an optical path length variation along a direction of material flow that provides a mechanism for temporal phase shifting, the method further comprising:
generating a series of phase-shifted snapshots in time, wherein each phase-shifted snapshot captures an image of an object in a different location in a sample channel as the object moves along a length of the sample channel from the inlet to the outlet;
determining a phase change in response to each phase-shifted snapshot; and
determining a phase associated with an object measurement in response to the phase change and the series of phase-shifted snapshots.

19. The method of claim 14, wherein each of the reference channels is configured to have an optical path length variation along a direction of material flow that provides a mechanism for temporal phase shifting, the method further comprising:
generating a series of phase-shifted snapshots in time, wherein each phase-shifted snapshot captures an image of an object to be measured at a different point in time and in a different location in a sample channel as the object moves along a length of the sample channel from the inlet to the outlet;
determining a phase change for each phase-shifted snapshot in each location of the sample channel including by applying a Least Squares Phase Shifting Interferometry technique; and
determining a phase associated with an object measurement in response to the phase change and the series of phase-shifted snapshots.

20. The method of claim 14, wherein each of the reference channels is configured to have an optical path length variation along a direction of material flow that provides a mechanism for temporal phase shifting, the method further comprising:
generating a series of phase-shifted snapshots in time of an object as the object moves along a length of a sample channel from the inlet to the outlet, including by:
i. obtaining a first snapshot of the object at a first time that corresponds to no phase shift;
ii. obtaining a second snapshot of the object at a second time subsequent to the first time that corresponds to a phase shift of about π/2 radians relative to the first snapshot;
iii. obtaining a third snapshot of the object at a third time subsequent to the second time that corresponds to a phase shift of about π/2 radians relative to the second snapshot;
iv. obtaining a fourth snapshot of the object at a fourth time subsequent to the third time that corresponds to a phase shift of about π/2 radians relative to the third snapshot; and
v. obtaining a fifth snapshot of the object at a fifth time subsequent to the fourth time that corresponds to a phase shift of about π/2 radians relative to the fourth snapshot; and
determining a phase associated with an object measurement in response to the series of phase-shifted snapshots.

21. A method of preparing a sheared microscopic slide comprising:
forming a bonding of a microfluidic channel body to a substrate, wherein the microfluidic channel body comprises an inlet reservoir configured to flow material into the microfluidic channel body and into a plurality of channels and an outlet reservoir configured to flow material out of the microfluidic channel body;
causing a flow of collagen suspension into the inlet through channels of the microfluidic channel body and out of an outlet reservoir;
causing a pause in the flow of collagen suspension to allow a collagen ingredient to settle down and coat a surface of the substrate to form a collagen coating on the surface;
causing a flow of sample material into the inlet through channels of the microfluidic channel body and out of an outlet reservoir;
causing a pause in the flow of sample material to allow a portion of the sample material to adhere to the collagen coating;
removing the microfluidic channel body from the substrate.

22. A system for preparing a sheared microscopic slide comprising:
a microfluidic chip comprising a microfluidic channel body, an inlet configured to receive a material, and an outlet configured to release a portion of the material, wherein the microfluidic channel body comprises a plurality of parallel channels of about equal width for holding the material spaced by a plurality of intervals of about equal width, wherein the width of each channel and the width of each interval are about equal, and wherein the microfluidic channel body is configured to reversibly bond to a substrate, the system further comprising a flow control mechanism for controlling a flow of the material received through the inlet, moved through the plurality of parallel channels, and released through the outlet, wherein the flow control mechanism is further configured to:
cause a flow of collagen suspension into the inlet through channels of the microfluidic channel body and out of an outlet reservoir;
cause a pause in the flow of collagen suspension to allow a collagen ingredient to settle down and coat a surface of the glass slide to form a collagen coating on the surface;
cause a flow of sample material into the inlet through channels of the microfluidic channel body and out of an outlet reservoir; and
cause a pause in the flow of sample material to allow a portion of the sample material to adhere to the collagen coating.

* * * * *

UNITED STATES PATENT AND TRADEMARK OFFICE
CERTIFICATE OF CORRECTION

PATENT NO. : 11,248,901 B2
APPLICATION NO. : 17/262656
DATED : February 15, 2022
INVENTOR(S) : Eric Peter Goodwin and Wan Qin It is certified that error appears in the above-identified patent and that said Letters Patent is hereby corrected as shown below:

On the Title Page

Item [73], after "Nikon Corporation", insert --, (JP)--.

In the Specification

In Column 11, Line 14, after "see,", delete "e.g." and insert --e.g.,--, therefor.
In Column 16, Line 35, before "direction", delete "they" and insert --the y--, therefor.
In Column 16, Line 37, before "direction", delete "they" and insert --the y--, therefor.
In Column 19, Line 64, before "direction", delete "they" and insert --the y--, therefor.

Signed and Sealed this
Seventh Day of June, 2022

Katherine Kelly Vidal
*Director of the United States Patent and Trademark Office*